US012561127B2

(12) United States Patent
Babayan et al.

(10) Patent No.: US 12,561,127 B2
(45) Date of Patent: Feb. 24, 2026

(54) TECHNIQUES FOR OVER-THE-AIR SOFTWARE UPDATES

(71) Applicant: Mercedes-Benz Group AG, Stuttgart (DE)

(72) Inventors: Movses Babayan, Monroe, WA (US); James Shimada, Seattle, WA (US); Liang Chen, Kirkland, WA (US); Lifang Pilarski, Gechingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 110 days.

(21) Appl. No.: 18/309,265

(22) Filed: Apr. 28, 2023

(65) Prior Publication Data

US 2024/0362011 A1 Oct. 31, 2024

(51) Int. Cl.
*G06F 8/65* (2018.01)

(52) U.S. Cl.
CPC ...................................... *G06F 8/65* (2013.01)

(58) Field of Classification Search
CPC .......................................................... G06F 8/65
See application file for complete search history.

(56) References Cited

U.S. PATENT DOCUMENTS

| | | | | |
|---|---|---|---|---|
| 7,911,957 B2 * | 3/2011 | Kim | .................... | H04L 47/6215 |
| | | | | 370/252 |
| 10,324,943 B2 * | 6/2019 | Shim | ..................... | G06F 16/248 |
| 10,841,791 B1 * | 11/2020 | Zhang | ................... | H04W 72/51 |
| 2005/0075144 A1 * | 4/2005 | Muramatsu | ............. | B60R 25/24 |
| | | | | 701/1 |

(Continued)

FOREIGN PATENT DOCUMENTS

| | | |
|---|---|---|
| CN | 111078241 A | 4/2020 |
| CN | 112600876 A | 4/2021 |

(Continued)

OTHER PUBLICATIONS

Shabir Balawal et al., "Congestion Avoidance in Vehicular Networks: A Contemporary Survey", IEEE Access, Nov. 27, 2019, vol. 7, pp. 173196-173215, XP011759071.

(Continued)

*Primary Examiner* — Jae U Jeon

(74) *Attorney, Agent, or Firm* — Dority & Manning, P.A.

(57) ABSTRACT

Methods, computing systems, and technology for distributing an over-the-air (OTA) vehicle software update are presented. The system can receive a notification having a vehicle identifier from a vehicle. Additionally, the system can determine a task having task attributes for the vehicle to download based on the vehicle identifier. Moreover, the system can determine, from among a plurality of consumption classes, a consumption class having a class consumption limit that is applicable to the task based on the task attributes. Furthermore, the system can obtain a current overall bandwidth value for a network. The current overall bandwidth value can indicate a currently remaining network bandwidth for a first time period. Subsequently, the system can determine, based on the class consumption limit and the current overall network bandwidth value, whether to transmit the task to the vehicle over the network during the first time period.

19 Claims, 12 Drawing Sheets

(56)          References Cited

U.S. PATENT DOCUMENTS

| | | | | |
|---|---|---|---|---|
| 2005/0249536 | A1* | 11/2005 | Sedky | G06F 3/1246 |
| | | | | 400/61 |
| 2006/0218635 | A1* | 9/2006 | Kramer | H04L 63/1441 |
| | | | | 726/22 |
| 2010/0082277 | A1* | 4/2010 | Ballard | B60L 53/50 |
| | | | | 701/22 |
| 2016/0335073 | A1* | 11/2016 | Hong | H04W 48/18 |
| 2016/0371105 | A1* | 12/2016 | Sieffert | G06F 8/656 |
| 2021/0089026 | A1* | 3/2021 | Bender | H04W 72/542 |
| 2021/0344604 | A1 | 11/2021 | Ingerman | |
| 2022/0405080 | A1* | 12/2022 | Ishikawa | H04W 8/205 |

FOREIGN PATENT DOCUMENTS

| | | | |
|---|---|---|---|
| CN | 109412959 | B | 8/2022 |
| CN | 111479261 | B | 11/2022 |
| GB | 2569112 | A | 6/2019 |

OTHER PUBLICATIONS

International Search Report with Written Opinion of the International Searching Authority for the Application No. PCT/EP2024/058988 mailed Jun. 25, 2024.
Bosch, Bosch IoT Device Management, https://docs.bosch-iot-suite.com/device-management/Bosch-IoT-Device-Management.html, retrieved on Apr. 28, 2023, 2 pages.

* cited by examiner

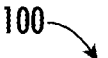
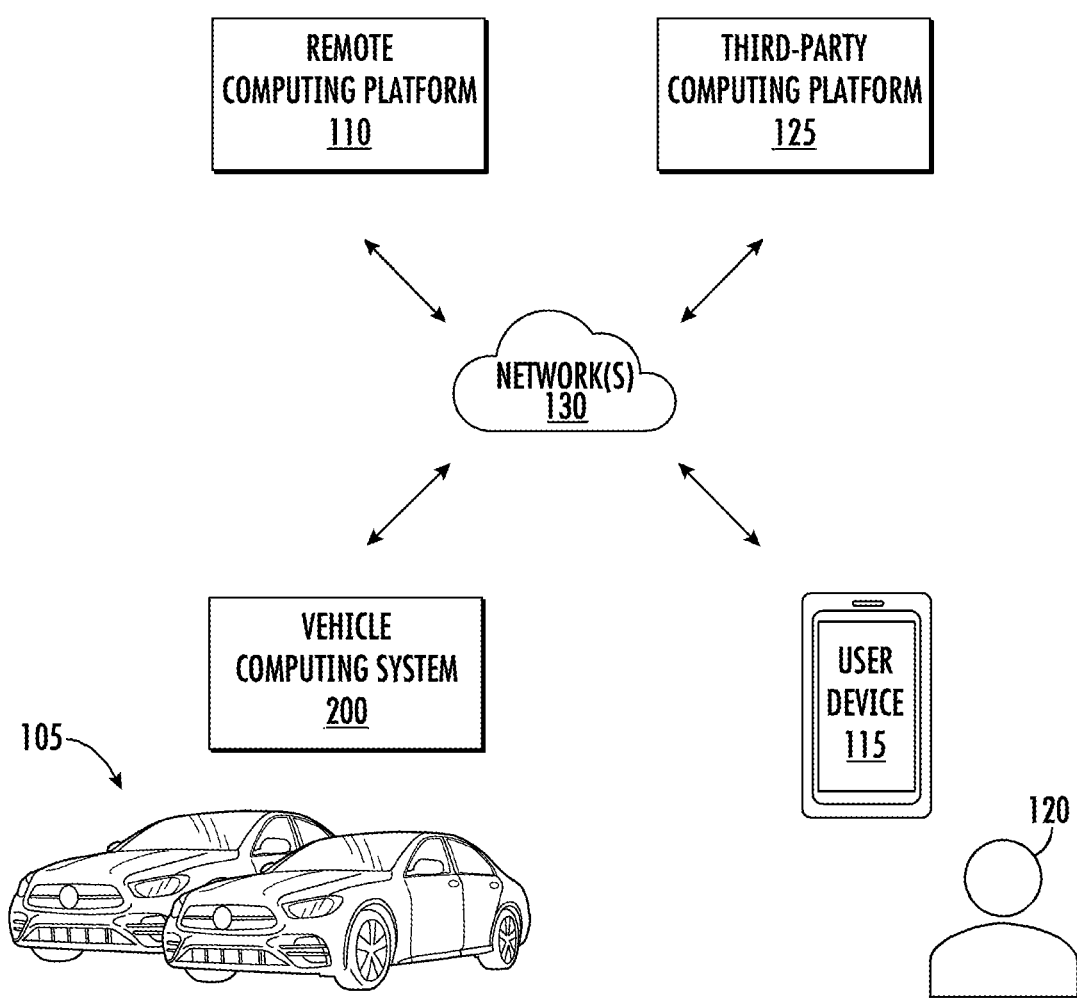
FIG. 1

200

SW BASE LAYER
210

HW BASE LAYER
205

CONTROLLER

225

220

CONTROLLER CONTROLLER

230

CONNECTIVITY
MODULE

HW BASE
LAYER
205

COMPUTER COMPUTER

COMPUTING
HARDWARE
215

COMPUTING PLATFORM 110

405 — VEH. SOFTWARE

410 — SOFTWARE UPDATES

415 — REMOTE ASSIST. SYS.

420 — ASSISTANCE DATA

425 — SECURITY SYSTEM

430 — SECURITY DATA

435 — NAVIGATION SYSTEM

440 — MAP DATA

445 — ENTERTAINMENT SYSTEM

450 — ENTERTAINMENT DATA

455 — USER SYSTEM

460 — USER PROFILE DATA

USER DEVICE 120

DISPLAY DEVICE — 500

USER INTERFACE — 505

APPLICATION — 510

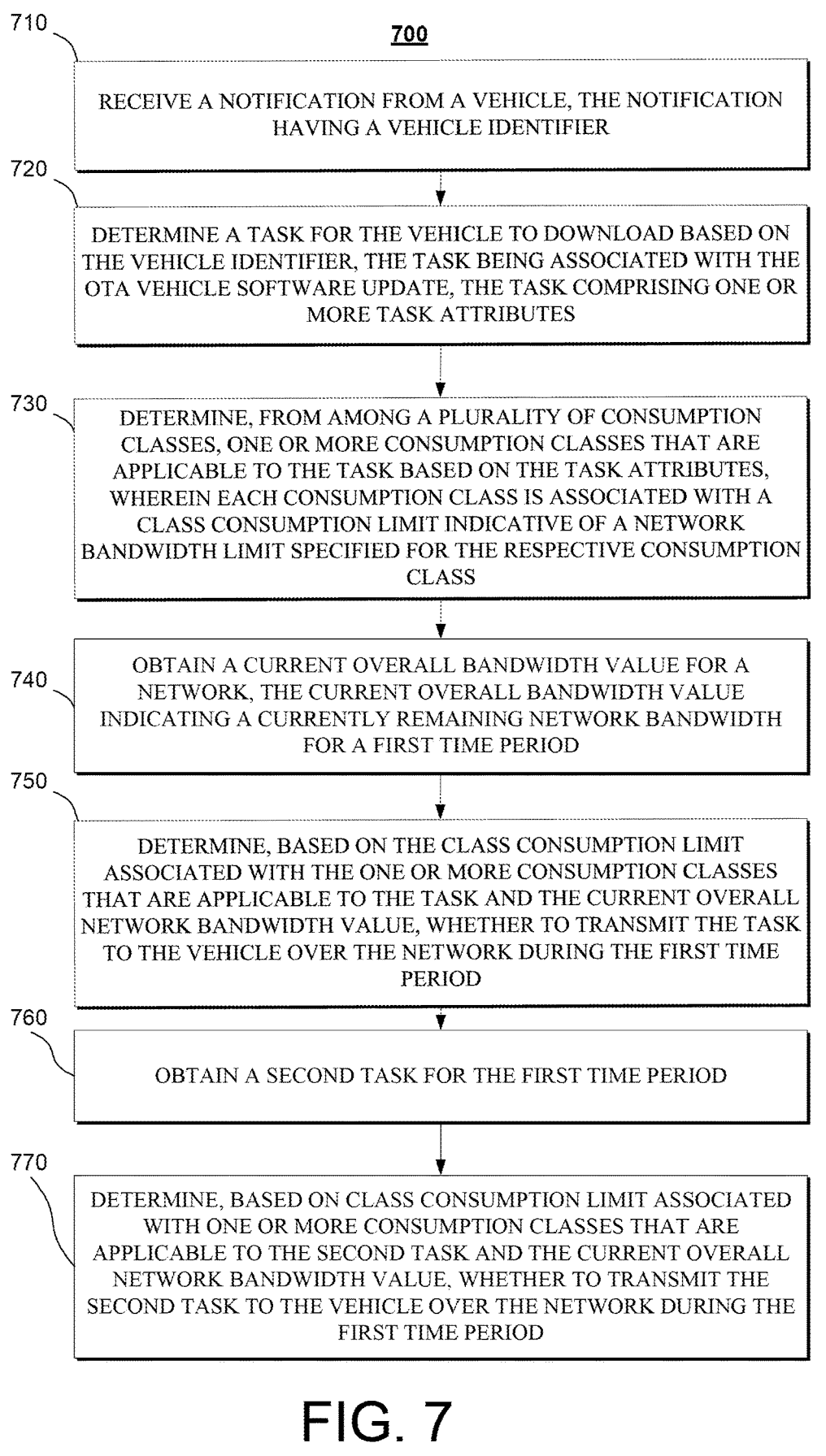

710

700

RECEIVE A NOTIFICATION FROM A VEHICLE, THE NOTIFICATION HAVING A VEHICLE IDENTIFIER

720

DETERMINE A TASK FOR THE VEHICLE TO DOWNLOAD BASED ON THE VEHICLE IDENTIFIER, THE TASK BEING ASSOCIATED WITH THE OTA VEHICLE SOFTWARE UPDATE, THE TASK COMPRISING ONE OR MORE TASK ATTRIBUTES

730

DETERMINE, FROM AMONG A PLURALITY OF CONSUMPTION CLASSES, ONE OR MORE CONSUMPTION CLASSES THAT ARE APPLICABLE TO THE TASK BASED ON THE TASK ATTRIBUTES, WHEREIN EACH CONSUMPTION CLASS IS ASSOCIATED WITH A CLASS CONSUMPTION LIMIT INDICATIVE OF A NETWORK BANDWIDTH LIMIT SPECIFIED FOR THE RESPECTIVE CONSUMPTION CLASS

740

OBTAIN A CURRENT OVERALL BANDWIDTH VALUE FOR A NETWORK, THE CURRENT OVERALL BANDWIDTH VALUE INDICATING A CURRENTLY REMAINING NETWORK BANDWIDTH FOR A FIRST TIME PERIOD

750

DETERMINE, BASED ON THE CLASS CONSUMPTION LIMIT ASSOCIATED WITH THE ONE OR MORE CONSUMPTION CLASSES THAT ARE APPLICABLE TO THE TASK AND THE CURRENT OVERALL NETWORK BANDWIDTH VALUE, WHETHER TO TRANSMIT THE TASK TO THE VEHICLE OVER THE NETWORK DURING THE FIRST TIME PERIOD

760

OBTAIN A SECOND TASK FOR THE FIRST TIME PERIOD

770

DETERMINE, BASED ON CLASS CONSUMPTION LIMIT ASSOCIATED WITH ONE OR MORE CONSUMPTION CLASSES THAT ARE APPLICABLE TO THE SECOND TASK AND THE CURRENT OVERALL NETWORK BANDWIDTH VALUE, WHETHER TO TRANSMIT THE SECOND TASK TO THE VEHICLE OVER THE NETWORK DURING THE FIRST TIME PERIOD

FIG. 7

TECHNIQUES FOR OVER-THE-AIR SOFTWARE UPDATES

FIELD

The present disclosure relates generally to performing over-the-air (OTA) updates for vehicles. In particular, the present disclosure relates to determining which OTA updates to transmit to a vehicle when the network is congested.

BACKGROUND

Over-the-air (OTA) updates refer to the process of wirelessly updating the software of a device, such as a smartphone, Internet of Things (IoT) device, or vehicle. OTA updates allow manufacturers to push updates and patches to devices remotely, without requiring users to connect their device or manually install the updates.

OTA updates are commonly used for fixing software bugs, improving device performance, adding new features, and addressing security vulnerabilities. OTA updates have become increasingly common in recent years as more devices are connected to the internet, making it easier for manufacturers to deliver updates quickly and efficiently.

Network congestion occurs when the demand for network resources, such as bandwidth, exceeds the available capacity of the network. For example, when too many vehicles are trying to access the same network or when too many OTA updates are being transmitted at once.

As a result of network congestion, data packets may be delayed or lost, causing slower data transfer speeds, and other issues. Congestion can also cause network performance to degrade, which can affect the quality of the user experience.

SUMMARY

Aspects and advantages of implementations of the present disclosure will be set forth in part in the following description, or may be learned from the description, or may be learned through practice of the implementations.

One example aspect of the present disclosure is directed to a computer-implemented method for distributing an over-the-air (OTA) vehicle software update. The computer-implemented method may include receiving a notification from a vehicle. The notification can include a vehicle identifier. Additionally, the method may include determining a task for the vehicle to download based on the vehicle identifier. The task may be associated with the OTA vehicle software update and may include one or more task attributes. Moreover, the method may include determining, from among a plurality of consumption classes, one or more consumption classes that are applicable to the task based on the task attributes. Each consumption class can be associated with a class consumption limit indicative of a network bandwidth limit specified for the respective consumption class. Furthermore, the method may include obtaining a current overall bandwidth value for a network. The current overall bandwidth value can indicate a currently remaining network bandwidth for a first time period. Subsequently, the method may include determining, based on the class consumption limit associated with the one or more consumption classes that are applicable to the task and the current overall network bandwidth value, whether to transmit the task to the vehicle over the network during the first time period.

In an embodiment, the determining whether to transmit the task to the vehicle over the network during the first time period may include determining that the data size of the task does not exceed the consumption class limit for any of the one or more consumption classes that are applicable to the task. Additionally, the method may include transmitting, over the network, the task for download by the vehicle.

In an embodiment, the determining whether to transmit the task to the vehicle over the network during the first time period may include determining that the data size of the task exceeds at least one consumption class limit of the one or more consumption classes that are applicable to the task. Additionally, the method may include storing, in a memory, the task for transmission to the vehicle during a second time period after the first time period.

In an embodiment, the one or more task attributes can include at least one of: (i) a type of task, (ii) a data size of the task; (ii) a model of the vehicle; (iv) a vehicle production date; or (iv) a country.

In an embodiment, each consumption class may have a priority ranking value. Additionally, the determination whether to transmit the task to the vehicle over the network during the first time period may be further based on the priority ranking value.

In an embodiment, the method may include accessing, from a memory, data indicative of a software version being currently operated in the vehicle based on the vehicle identifier. Additionally, the task for the vehicle to be downloaded may be predetermined based on the software version. Moreover, the method may include receiving a confirmation that the vehicle has installed the task. Furthermore, the method may include updating the software version being currently operated in the vehicle based on the confirmation. Subsequently, the method may include storing the updated software version in a lookup table in the memory.

In an embodiment, the task may be transmitted during the first time period when the current overall bandwidth value for the first time period is below an overall bandwidth threshold for the network during the first time period.

In an embodiment, the task may be transmitted during a second time period when the current overall bandwidth value for the first time period exceeds an overall bandwidth threshold for the network, and wherein the second time period is after the first time period.

In an embodiment, the task can be a first task. Additionally, the method may include obtaining a second task for the first time period. Moreover, the method may include determining, based on class consumption limit associated with one or more consumption classes that are applicable to the second task and the current overall network bandwidth value, whether to transmit the second task to the vehicle over the network during the first time period. The second task may be transmitted during the first time period when it is determined that a data size of the second task does not exceed the consumption class limit for any of the one or more consumption classes that are applicable to the second task.

In an embodiment, the vehicle identifier can include a location of the vehicle that is associated with a first region. Additionally, the method may include obtaining a first region bandwidth value for a first time period. Moreover, the determination on whether to transmit the task to the vehicle during the first time period is further based on the first region bandwidth value.

In an embodiment, the method may include transmitting the task to the vehicle over the network during the first time period. Additionally, the method may include updating the current overall bandwidth value for the network during the first time period based on a data size associated with the task transmitted to the vehicle.

Another example aspect of the present disclosure is directed to a computing system having a control circuit. The control circuit may be configured to receive a notification from a vehicle. The notification can include a vehicle identifier. Additionally, the control circuit may be configured to determine one or more tasks for the vehicle to download based on the vehicle identifier, the one or more tasks being associated with an over-the-air (OTA) vehicle software update. Moreover, the control circuit may be configured to determine, from among a plurality of consumption classes, one or more consumption classes that are applicable to the one or more tasks. Each consumption class can be associated with a class condition for the respective consumption class. the class condition can include a class consumption limit indicative of a network bandwidth limit specified for the respective consumption class. Furthermore, the control circuit may be configured to obtain a current overall bandwidth value for a network, the current overall bandwidth value indicating a currently remaining network bandwidth for a first time period. Subsequently, the control circuit may be configured to determine, based on the class conditions associated with the one or more consumption classes that are applicable to the task and the current overall network bandwidth value, whether to transmit the one or more tasks to the vehicle over the network during the first time period.

In an embodiment, the determining whether transmit the one or more tasks to the vehicle over the network during the first time period may include the control circuit being configured to determine that the data size of a first task, of the one or more tasks, does not exceed the consumption class limit for any of the one or more consumption classes that are applicable to the first task. Additionally, the control circuit may be further configured to transmit, over the network, the first task for download by the vehicle.

In an embodiment, the determining whether to transmit the one or more tasks to the vehicle over the network during the first time period may include the control circuit being configured to determine that the data size of a second task, of the one or more tasks, exceeds at least one consumption class limit of the one or more consumption classes that are applicable to the second task. Additionally, the control circuit may be further configured to store, in a memory, the second task for transmission to the vehicle during a second time period after the first time period.

In an embodiment, the one or more tasks may include a first task having a first type of software update and a second task having a second type of software update. Additionally, the first type of software update may have a higher priority than the second type of software update.

For example, the first type of software update can be a software security update, and the second type of software update can be an operating system update.

In an embodiment, the one or more tasks may include a first task, and the control circuit may be further configured to obtain a first task bandwidth value for the first time period, the first task bandwidth value indicating a currently remaining network bandwidth for the first task. Additionally, the control circuit may be configured to determine, based on the first task bandwidth value, whether to transmit the first task to the vehicle over the network during the first time period.

In an embodiment, the control circuit may be further configured to determine that a data size of the first task does not exceed the first task bandwidth value. Additionally, the control circuit may be further configured to transmit, over the network, the first task for download by the vehicle.

Yet another example aspect of the present disclosure is directed to one or more non-transitory computer-readable media that store instructions that are executable by a control circuit to perform operations. The control circuit may receive a notification from a vehicle, the notification having a vehicle identifier. Additionally, the control circuit may determine one or more tasks for the vehicle to download based on the vehicle identifier. The one or more tasks can be associated with the OTA vehicle software update. Moreover, the control circuit may determine, from among a plurality of consumption classes, one or more consumption classes that are applicable to the one or more tasks. Each consumption class can be associated with one or more class conditions for the respective consumption class, the class conditions comprising a class consumption limit indicative of a network bandwidth limit specified for the respective consumption class. Furthermore, the control circuit may obtain a current overall bandwidth value for a network, the current overall bandwidth value indicating a currently remaining network bandwidth for a first time period. Subsequently, the control circuit may determine, based on the class conditions associated with the one or more consumption classes that are applicable to the task and the current overall network bandwidth value, whether to transmit the one or more tasks to the vehicle over the network during the first time period.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 1 illustrates an example computing ecosystem according to an embodiment hereof.

FIG. 7 illustrates a flowchart diagram of an example method for distributing an over-the-air (OTA) vehicle software update according to an embodiment hereof.

DETAILED DESCRIPTION

Figures 2A, 2B:
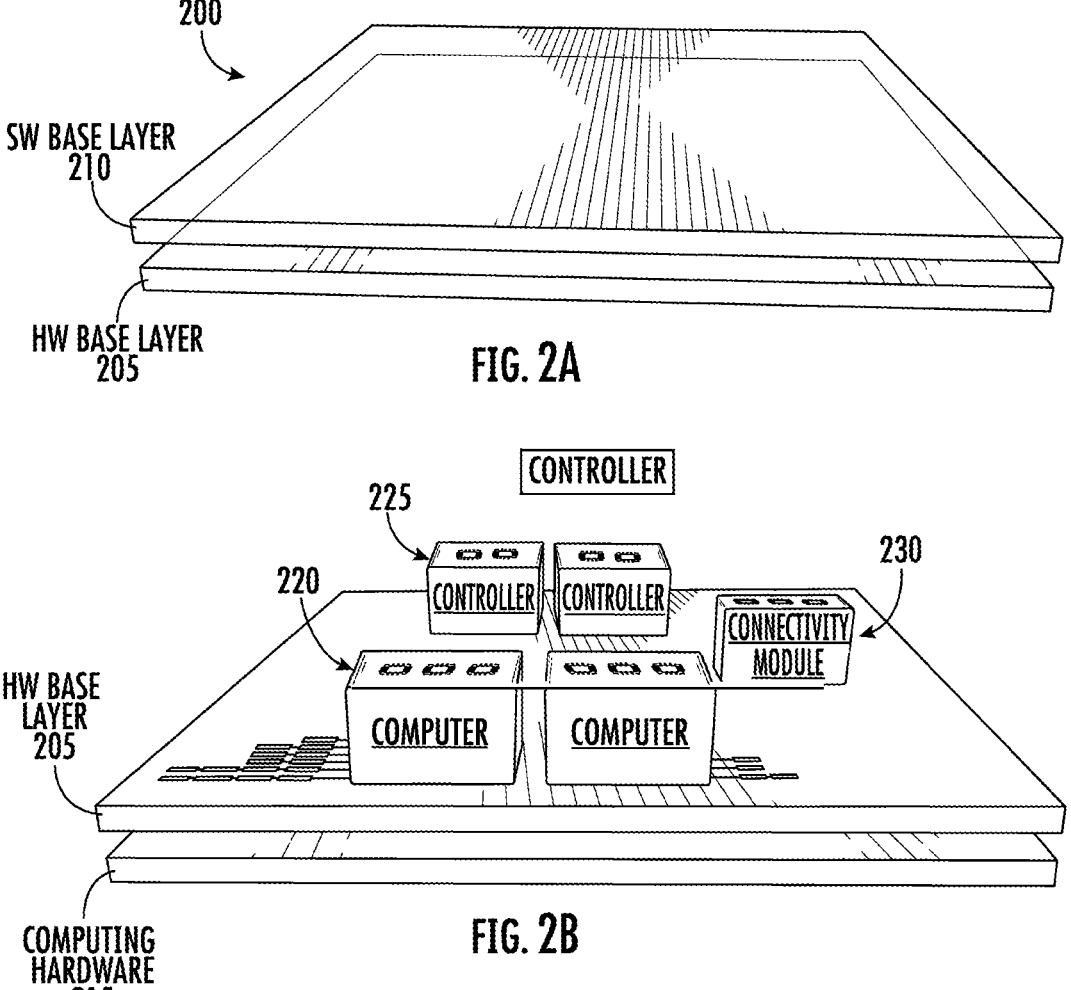
FIGS. 2A-D illustrate diagrams of an example computing architecture for an onboard computing system of a vehicle according to an embodiment hereof.

An aspect of the present disclosure relates to methods and computing systems for transmitting OTA updates over a network (e.g., cellular network). In some instances, the network may have a consumption limit for a time period (e.g., a plurality of gigabytes per minute). The consumption limit can be associated with a finite capacity of the network. In some instances, when the aggregated demand of transmitting and downloading OTA updates to the different IoT devices (e.g., vehicles) exceeds the consumption limit, network congestion may occur. Additionally, when many different types of OTA updates are being transmitted during the same time period, the system may not have capacity to transmit all of the updates during the same time period.

To help address these network traffic obstacles, the systems of the present disclosure can prioritize certain updates using network consumption classes that help organize and transmit the OTA updates based on task attributes of the respective OTA updates and class consumption limits. The techniques described herein enable classes of individual OTA update tasks to be downloaded based on flexible criteria, bandwidth limits for these classes, and an overall bandwidth limit for all tasks.

Each OTA update can include one or more task attributes. The task attributes can include a type of task, a data size of the task, a model of the vehicle, a vehicle production phase, or a country. Additionally, the OTA updates can be transmitted based on a priority list. For example, OTA updates that are deemed to be critical updates can have the highest priority and be performed first.

In some instances, the system can have conditions (e.g., consumption limit for each class) and priority policies that describe the mechanisms to distribute a given OTA update to a specific set of vehicles. For example, the system can determine, based on the class consumption limit associated with a consumption class that are applicable to the OTA update task and the current overall network bandwidth value, whether to transmit the OTA update task to a vehicle over the network during a first time period. The system can determine that the data size of the task does not exceed the consumption class limit for any of the consumption classes that are applicable to the task, and transmit, over the network, the task for download by the vehicle. Alternatively, the system can determine that the data size of the task exceeds at least one consumption class limit of the consumption classes that are applicable to the task, and storing, in a memory, the task for transmission to the vehicle during a second time period after the first time period.

Additionally, the conditions and priority policies can vary based on the vehicle (e.g., based on a vehicle identifier number (VIN)), such that when the vehicle communicates with the system, the system notifies the vehicle of the update task, and the vehicle executes the update task. For example, based on the VIN, the system can determine a list of OTA updates that need to be performed for the specific vehicle. Subsequently, based on the conditions and the priority policies, the system can determine when to transmit each OTA update in the list of OTA updates to the specific vehicle. When it comes to OTA updates, executing the update task can involve downloading a software update package over the network. Since each task is derived from a condition that specifies which software package is to be downloaded, and the data size of the software package is known prior to the tasking, the system can determine the amount of bandwidth a given task will consume. The system may selectively withhold notifying a consumer of a task (e.g., a vehicle) unless it fulfills the specified conditions.

According to some embodiments, the system may model the task execution criteria based on consumption classes that are applicable to the task. For example, the task can be associated with a plurality of task attributes, and each task attribute can be associated with one or more consumption class. Each consumption class can have a consumption class limit which limits the amount of data that can be transmitted for that specific consumption class in a time period. Each consumption class may have a condition that specifies the set of tasks in that class and a consumption limit in terms of data size (e.g., GB) for a given period of time (e.g., time interval). The given period of time can be associated with the consumption limits specified for all classes that are enforced. For example, if the time interval is 5 minutes, then the consumption limit shall not be exceeded in any 5-minute window. The condition associated with each consumption class can be an arbitrary Boolean expression (e.g., true, false) based on information derived from the task, the vehicle, and/or the consumption class. The condition can be predicated on a task attribute of the vehicle or a task attribute of the condition. The task attribute of the vehicle can be an attribute of the vehicle (e.g., attributes of the destination computing device, country vehicle was sold in). The task attributes of the condition can be an attribute that the condition is derived from (e.g., type of software update campaign, business-level attributes).

Moreover, a given task may be part of a number of consumption classes. At the time of notifying the consumer of a task, the system may determine which consumption classes the task belongs to, if any. In some instances, when the task does not belong to any consumption class, the task is always distributed to the consumer. Otherwise, if the size of the task would cause the cumulative consumption limit of any consumption class to be exceeded for the trailing time interval, the task may be withheld.

Furthermore, to ensure that the overall allowed network bandwidth is not exceeded in order to prevent network congestion, the system can specify a single consumption class with a condition that is always true (e.g., matches all tasks) where the consumption limit is equal to the overall allowed network bandwidth (e.g., a current overall network bandwidth value).

In an embodiment, the system may reserve certain portions of the network bandwidth to avoid over-consumption by certain types of tasks. By way of example, when the system makes a determination that a first type OTA update will not consume more than 25% of the overall bandwidth, the system can configure a consumption class for the first type of OTA update with a consumption limit equal to 25% of the current overall network bandwidth value. In another example, when the system reserves at least 10% of the overall bandwidth (e.g., the current overall network bandwidth value) for a second type of OTA update, the system can associate a consumption class that does not match the second type of OTA update and specify a consumption limit of 90% of the current overall network bandwidth value.

The technology of the present disclosure provides a number of computing improvements and technical effects. For example, the technology of the present disclosure can improve the efficiency of the computing resources by reducing network congestion and network failure. Network congestion can be reduced by regulating the flow of downloadable tasks (e.g., OTA updates) on the network by prioritizing OTA updates, such that critical updates have higher priority. This can help prevent congestion by ensuring that critical traffic is given priority. Additionally, the techniques described herein improve the Quality of Service (QOS) for OTA updates. By setting policies that prioritize certain types of OTA updates over others based on factors such as task attributes, priority list, bandwidth, latency, and packet loss. QoS can help prevent congestion by ensuring that high-priority traffic is given preferential treatment. Moreover, the techniques described herein improve load balance across the different regions. Load balancing involves distributing network traffic evenly across multiple regions to prevent congestion in any single region.

The technology of the present disclosure may also improve computing technology for distributing tasks as well as the computers of the task recipients such as vehicles and other IoT devices. For example, a computing system (e.g., a cloud-based computing platform) may receive a notification from a vehicle, including a vehicle identifier. The computing system may determine a task for the vehicle to download based on the vehicle identifier. As described herein, the task may include an OTA vehicle software update and the task may include one or more task attributes. The computing system may determine a consumption class, from among a plurality of consumption class, which is applicable to the task based on the task attributes. The consumption class may include a class consumption limit indicative of a network bandwidth limit specified for the respective consumption class (e.g., 30 GB). The computing system may obtain a current overall bandwidth value for a network (e.g., cellular network), which can indicate the currently remaining network bandwidth for a first time period. The computing system may determine whether to transmit the task to the vehicle over the network during the first time period based on the class consumption limit that is applicable to the task and the current overall network bandwidth value. In this way, the computing system may improve the efficiency and frequency with which download tasks (e.g., OTA updates) are successfully delivered to a vehicle. This can reduce computational waste associated with re-processing tasks for later transmission in the event of a delivery failure due to a lack of network bandwidth. This can lead to an improved usage of the system's (and the network's) computing resources.

Moreover, this technique can improve the functionality of the computing system onboard the vehicle (or other IoT device). For instance, as described herein, the technology of the present disclosure allows for more reliable delivery of OTA software updates. As such, the computing system onboard the vehicle is more likely to receive such updates at a time when the vehicle can download the OTA update. As such, the vehicle's computing system will remain more up-to-date and avoid the computational inefficiencies caused by processing and maintaining out-of-date software packages and versions, which can lead to higher onboard latency. Rather, the vehicle computing system is able to remain current with its software and avoid computational waste of the computing resources onboard the vehicle, which are already more limited than conventional computing stacks due to size and mobility constraints.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Although some of the techniques described herein focus on utilizing a modern vehicle as a client device receiving the OTA updates, the techniques can be performed by any IoT device. An IoT device can be a physical device that is connected to a network and can communicate with other devices, collect data, exchange data, and perform various functions without requiring human intervention. These devices can range from simple sensors that measure temperature or humidity to more complex devices such as home automation systems, smart appliances, industrial machinery, and modern vehicles.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of the ordinary skills in the art will understand the operation of conventional vehicle components in vehicle 105.

The vehicle 105 may include a vehicle computing system 200. As described herein, the vehicle computing system 200 is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. For example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 230 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 230 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
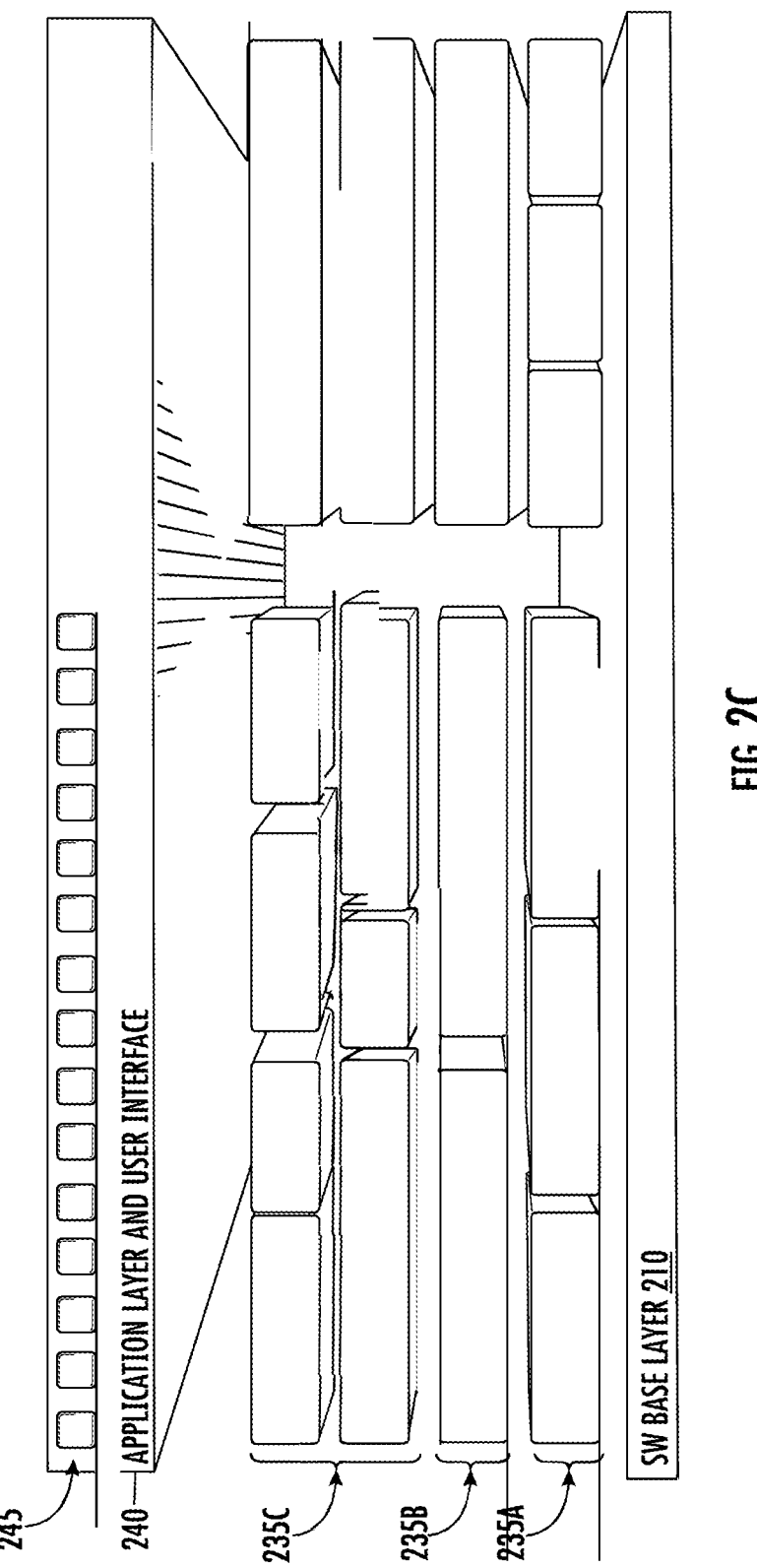

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-C. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
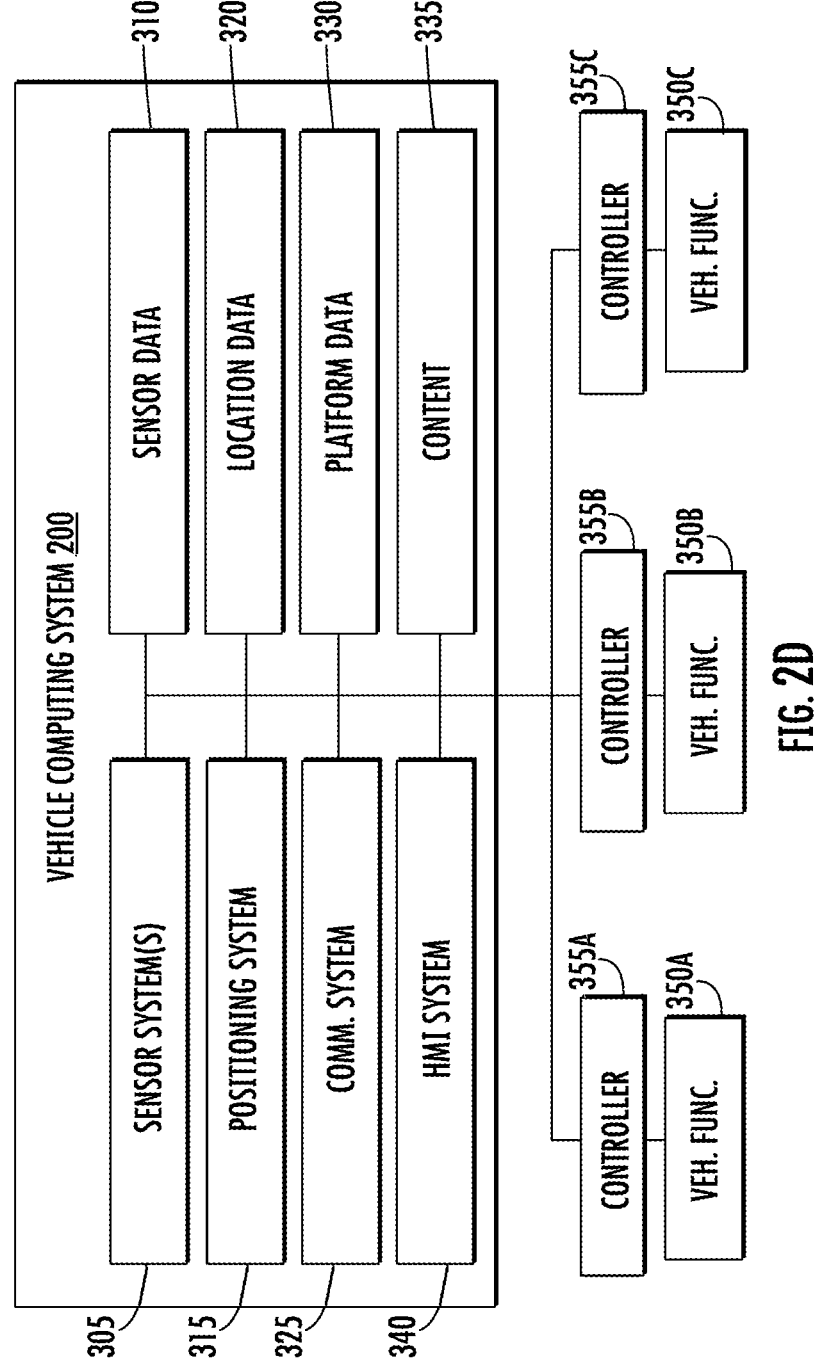

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communication unit 325 configured to allow the vehicle 105 (and its vehicle computing system 200) to communicate with other computing devices. The vehicle computing system 200 may use the communication unit 325 to communicate with the remote computing platform 110 or one or more other remote computing devices over a network 130 (e.g., via one or more wireless signal connections). For example, the vehicle computing system 200 may utilize the communication unit 325 to receive platform data 330 from the computing platform 110. This may include, for example, an over-the-air (OTA) software update for the operating system of the vehicle computing system 200. Additionally, or alternatively, the vehicle computing system 200 may utilize the communication unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communication unit 325 may allow communication among one or more of the systems on-board the vehicle 105.

In an embodiment, the communication unit 325 may be configured to allow the vehicle 105 to communicate with or otherwise receive data from the user device 115 (shown in FIG. 1). The communication unit 325 may utilize various communication technologies such as, for example, Bluetooth low energy protocol, radio frequency signaling, or other short range or near field communication technologies. The communication unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
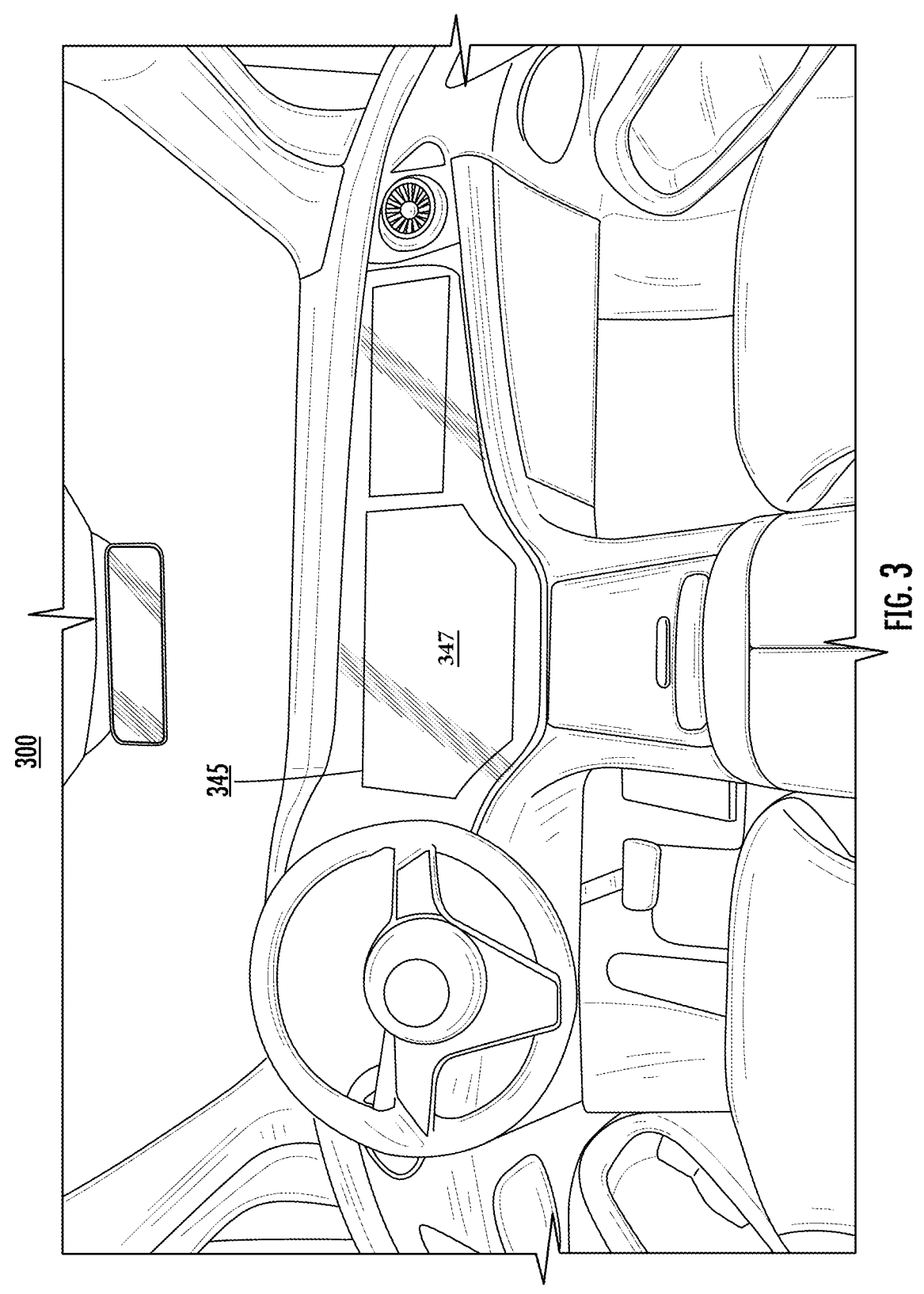
FIG. 3 illustrates an example vehicle interior with an example display according to an embodiment hereof.

FIG. 3 illustrates an example vehicle interior 300 with a display device 345. The display device 345 may be a component of the vehicle's head unit 347 or infotainment system. Such a component may be referred to as a display device of the infotainment system or be considered as a device for implementing an embodiment that includes the use of an infotainment system. For illustrative and example purposes, display devices within the vehicle 105 may include and be referred to herein as a head unit display device (e.g., positioned in a front/dashboard area of the vehicle interior), a rear unit display device (e.g., positioned in the back passenger area of the vehicle interior), an infotainment head unit or rear unit, or the like.

In an example, the display device 345 may be located on, form a portion of, or function as a dashboard of the vehicle 105. The display device 345 may include a display screen, CRT, LCD, plasma screen, touch screen, TV, projector, tablet, and/or other suitable display components.

The display device may display a variety of content 335 to the user 120 including information about the vehicle 105, prompts for user input, etc. The display device may include a touchscreen through which the user 120 may provide user input to a user interface.

For example, the display device 345 may include a user interface rendered via a touch screen that presents various content 335. The content 335 may include vehicle speed, mileage, fuel level, charge range, navigation/routing information, audio selections, streaming content (e.g., video/image content), internet search results, comfort settings (e.g., temperature, humidity, seat position, seat massage), or other vehicle data.

The display device 345 may render content 335 to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

Returning to FIG. 2D, the vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be transmitted to the computing platform 110.

Figure 4:
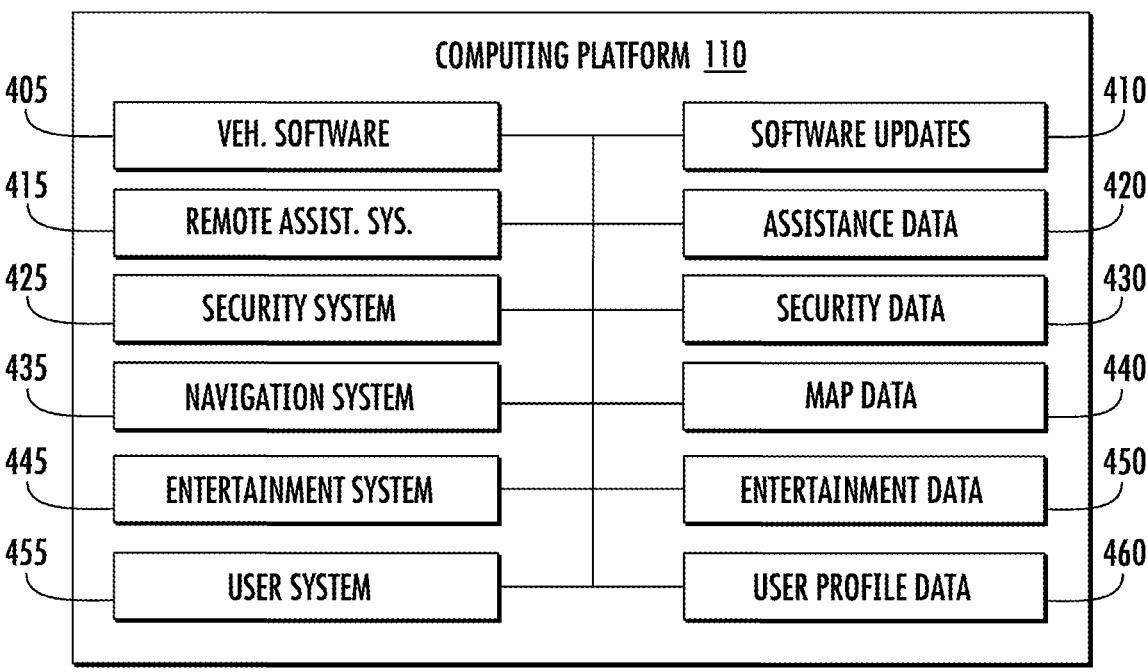
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more OTA software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle computing system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and OTA updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 105, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 120.

Figure 5:
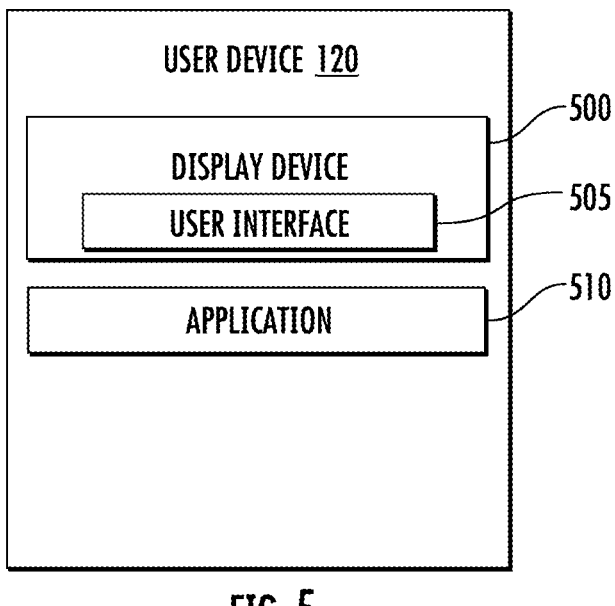
FIG. 5 illustrates a diagram of an example user device according to an embodiment hereof.

FIG. 5 illustrates a diagram of example components of user device 120 according to an embodiment hereof. The user device 120 may include a display device 500 configured to render content via a user interface 505 for presentation to a user 120. The display device 500 may include a display screen, CRT, LCD, plasma screen, touch screen, TV, projector, tablet, or other suitable display components. The user device 120 may include a software application 510 that is downloaded and runs on the user device 120. In some implementations, the software application 510 may be associated with the vehicle 105 or an entity associated with the vehicle 105 (e.g., manufacturer, retailer, maintenance provider). In an example, the software application 510 may enable the user device 120 to communicate with the computing platform 110 and the services thereof.

The technology of the present disclosure allows the remote computing platform 110 to perform OTA updates for vehicle computing system 200 without causing network congestion. More particularly, the vehicle manager 610 can determine when to transmit a task associated with an OTA update to a vehicle based on consumption class limits of consumption classes associated with the task. As described herein, this technology can overcome potential drawbacks (e.g., network congestion, network failure) introduced in convention OTA update techniques by dynamically determining which OTA updates to perform based on the status of the network.

Figure 6:
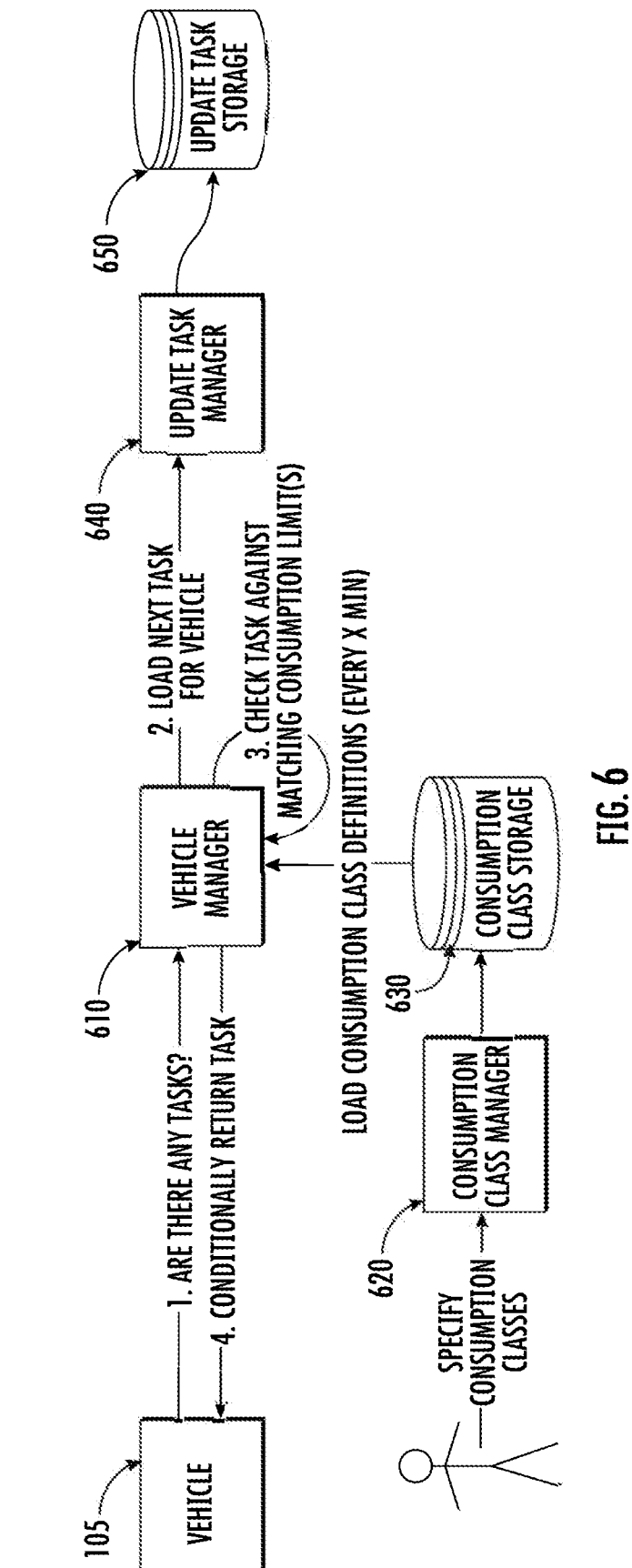
FIG. 6A illustrates a diagram of an OTA task update system according to an embodiment hereof.
FIGS. 6B-D illustrate examples of tasks and consumption classes associated with the tasks according to an embodiment hereof.

FIG. 6A illustrates a diagram of an OTA task update system 600 according to an embodiment of herein. The OTA task update system 600 may be configured to provide tasks for the vehicle 105. Components of OTA task update system 600 may be included within computing platform 110. For instance, the OTA task update system 600 may include a vehicle manager 610, a consumption class manager 620, a consumption class storage 630, an update task manager 640, and an update task storage 650. These components may be implemented within the computing platform 110, which is remote from vehicle 105. For instance, these components may be implemented within or include the vehicle software system 405. As such, the operations described below as being performed by these components may be performed by the computing platform 110.

The vehicle manager 610 may be configured to execute operations for determining what tasks (e.g., OTA updates) are to be transmitted to the vehicle 105. The vehicle manager 610 may be communicatively connected with one or more other managers or memories. For instance, the vehicle manager 610 may communicate or otherwise access, over a network, an update task manager 640 and an update task storage 650. The update task manager 640 may be configured to access a stored data structure indicative of the current tasks associated with the vehicle 105. This data structure may be stored in the update task storage 650 or another memory. In an example, the data structure may indicate the current software versions downloaded on the vehicle computing system 200. The update task storage 650 may be configured to store downloadable tasks. This may include downloadable tasks such as OTA software updates including the latest software versions that are to be transmitted to the vehicle 105.

The vehicle manager 610 may be in communication with the consumption class storage 630. The consumption class storage 630 may store the latest consumption classes as defined by the consumption class manager 620. The definitions of the latest consumption classes may be loaded periodically (e.g., every X min) so that they are available to the vehicle manager 610. A consumption class can define one or more conditions that specify one or more tasks in that class and a consumption limit (e.g., in terms of data size). The consumption class may be associated with a time interval where the consumption limits specified for all classes are enforced. For example, if the time interval is five minutes, then the consumption limit is not to be exceeded in any five minute window. The condition(s) associated with each consumption class may be an arbitrary Boolean expression predicated on information addressable by the task. For example, the condition can be predicated on attributes of the vehicle the task (e.g., OTA software update) is intended for, attributes of the rule that the task is derived from (e.g., type of software update campaign, business-level attributes, etc.).

The tasks can be evaluated against the consumption classes by the vehicle manager 610 when determining whether to transmit a task to the vehicle 105.

The vehicle 105 (e.g., the vehicle computing system 200) may request the vehicle manager 610 (e.g., the remote computing platform 110) for OTA task updates. For instance, the vehicle manager 610 may receive a notification from a vehicle 105. The notification may have a vehicle identifier associated with the vehicle 105.

The vehicle manager 610 may determine a task for the vehicle 105 to download based on the vehicle identifier. The vehicle manager 610 may be configured to access one or more tasks from the update task storage 650 and provide one or more tasks that are to be downloaded by the vehicle 105. For instance, the vehicle manager 610 may access, from a memory, data indicative of a software version being currently operated in the vehicle 105 based on the vehicle identifier. The software versions may be indexed in a look-up table by vehicle identifier. The vehicle manager 610 may perform a look-up or other search function to access this information for the specific vehicle 105. In some implementations, this information may be stored in a memory of the vehicle manager 610. Additionally, or alternatively, this information may be provided via the update task manager 640.

The task for the vehicle to download may be associated with an OTA software update. For instance, the task may include the latest version of a software application that is currently downloaded on the vehicle 105 but not yet updated. The latest version may include an update or roll-out of features of the software, bug fixes, etc. The task may include one or more task attributes. The one or more task attributes may include, for example, a type of task, a data size of the task; a model of the vehicle; a vehicle production date; or a country. The vehicle manager 610 may load a first task for the vehicle 105. The first task (e.g., a first OTA update) for the vehicle 105 to download may be predetermined based on the software version currently on the vehicle 105.

The vehicle manager 610 may determine, from among a plurality of consumption classes, one or more consumption classes that are applicable to the task based on the task attributes. In some instances, each task may be associated with one or more consumption class, which can be managed by the consumption class manager 620. A respective task may be a member of any number of consumption classes. For example, the first task can be associated with a first consumption class and a second consumption class.

In an example, to identify the applicable consumption classes, the vehicle manager 610 may perform a look-up function based on the task attributes. For instance, an OTA software update may be associated with a string that includes unique identifiers, each representing a different task attribute. For example, there may be a unique identifier (e.g., an access key) assigned to the particular task type (e.g., security software update). The unique identifiers may be static or dynamic (e.g., created upon request for the task payload). Each consumption class may also be stored with the unique identifiers associated with the task attributes that are applicable to the class (e.g., a task type). The vehicle manager 610 may perform a look-up function using the unique identifiers associated with the task attributes to find which consumption classes have matching identifiers. The vehicle manager 610 can utilize then utilize the class conditions (e.g., predicates related to the data size) to determine whether or not to transmit the OTA software update to the vehicle 105, as further described herein.

In some implementations, the vehicle manager 610 may perform a parsing function to determine which consumption classes are applicable to a task. In an example, an OTA software update may be represented as a text string. The text string may include one or more elements that indicate the task attributes. The vehicle manager 610 may be configured to parse the text string to identify these elements. The vehicle manager 610 may then utilize this information to generate and transmit a query to the consumption class storage 630 for the applicable consumption classes. The consumption class storage 630 may be configured to match the task attributes with the metadata stored with the consumption classes to identify the applicable consumption classes for the particular OTA software update. The consumption class storage 610 may transmit a response indicating the applicable consumption classes to the vehicle manager 610.

In some implementations, at the time of notifying the vehicle 105, of the task for the vehicle 105 to download, the vehicle manager 610 may determine which consumption classes the task belongs to, if any. As described herein, each consumption class may be associated with a class consumption limit indicative of a network bandwidth limit specified for the respective consumption class.

The consumption class storage 630 can keep track of the amount of data being transmitted over the network for each consumption class. Moreover, the vehicle manager 610 can access the amount of data being transmitted over the network for the first and second consumption classes in a first period.

The vehicle manager 610 may obtain a current overall bandwidth value for a network. For instance, vehicle manager 610 may be configured to probe, test, or otherwise request data from a network that is indicative of a current overall bandwidth value. This value may indicate a currently remaining network bandwidth for a first time period. For example, the overall network bandwidth for a cellular network available to the vehicle 105 and the computing platform 100 may be 100 GB within a specified time interval (e.g., 5 minutes). The current overall bandwidth value may be indicative of how much of the 100 GB bandwidth remains available for the time interval.

The vehicle manager 610 may determine, based on the class consumption limit associated with the one or more consumption classes that are applicable to the task and the current overall network bandwidth value, whether to transmit the task to the vehicle 105 over the network during a first time period. The vehicle manager 610 may check the task against matching consumption limits. For instance, the vehicle manager 610 may determine that the data size of a task does not exceed the consumption class limit for any of the one or more consumption classes that are applicable to the task. In response, the vehicle manager 610 may transmit (e.g., over the network) the task for download by the vehicle 105. By way of example, the vehicle manager 610 may determine the consumption class limit associated with the first and second consumption classes have not been exceeded during the first time period. If none of the consumption class limits have been exceeded, then the vehicle manager 610 may transmit the first task to the vehicle 105.

Alternatively, the vehicle manager 610 may determine that the data size of the task exceeds at least one consumption class limit of the one or more consumption classes that are applicable to the task. In response, the vehicle manager may store (e.g., in update task storage 650) the task for transmission to the vehicle 105 during a second time period after the first time period. For example, if one of the consumption class limits will be exceeded if the first task is transmitted to the vehicle during the first period, then the vehicle manager 610 can transmit the task to the vehicle 105 during a second time period (e.g., after the current 5 min interval, later in the day, etc.). In another example, the vehicle manager 610 may determine that the data size of a second task exceeds at least one consumption class limit of the one or more consumption classes that are applicable to the second task. In response, the vehicle manager 610 may be configured to store, in a memory, the second task for transmission to the vehicle 105 during a second time period after the first time period.

In some implementations, the vehicle manager 610 may evaluate an overall bandwidth threshold for a network for a given time period. For example, the vehicle action manager may compare the current overall bandwidth value (e.g., 50 GB) to an overall bandwidth threshold (e.g., 100 GB) for the network during the firm time period. The overall bandwidth threshold may be indicative of the total bandwidth allocated for OTA software updates over the network during the first time period. The task may be transmitted to the vehicle 105 during the first time period when the current overall bandwidth value for the first time period is below the overall bandwidth threshold for the network during the first time period. Alternatively, the task may be transmitted to the vehicle 105 during a second time period when the current overall bandwidth value for the first time period exceeds an overall bandwidth threshold for the network. The second time period being after the first time period.

In some implementations, the vehicle manager 610 may determine whether to transmit a task to the vehicle 105 based on a priority. For instance, each task and/or consumption class may include a priority ranking value. For example, the priority ranking value can be a numerical value from 0 to 10, with 10 being the highest priority and 0 being the lowest priority. The priority ranking value may indicate different levels of importance to different types of consumption classes or tasks when transmitting over a network. In some instances, OTA updates that are considered more important or time-sensitive are assigned a higher priority ranking value than less important or non-urgent data. The priority ranking value can be determined by different factors such as attribute type of the task, metadata associated with the task, the vehicle requirements, and the network capabilities. By prioritizing transmission of OTA updates, the system can ensure that critical or important updates are delivered in a timely manner, even in situations where network resources are limited or congested. The vehicle manager 610 may determine whether to transmit the task to the vehicle over the network during the first time period is further based on the priority ranking value. For example, the vehicle manager 610 may determine to transmit the task to the vehicle 105 in the event the consumption class associated with the task has a priority ranking value that is greater than other classes.

In another example, the vehicle manager 610 may compare the priorities of tasks to one another. For instance, a first task may have a first type of software update (e.g., a software security update) and a second task may have a second type of software update (e.g., an operating system update). The first type of software update may have a higher priority than the second type of software update. Thus, the vehicle manager 610 may prioritize the first task for the vehicle 105 over the second task, in the event that neither violates the consumption limits of their respective applicable classes.

If a task belongs to no consumption class, the task may be transmitted to the vehicle 105 without constraints on the bandwidth consumed by the task or priority rankings.

As described herein, the vehicle manager 610 may be configured to maintain a data structure indicative of the current status of the software of the vehicle computing system 200. This includes updating the data structure in response to the vehicle 105 downloading a task. By way of example, once the task has been transmitted by the vehicle manager 610, then the vehicle 105 can download the OTA update associated with the first task. Furthermore, the vehicle manager 610 can receive confirmation that the vehicle 105 has installed the task (e.g., via a communication from the vehicle 105). The vehicle manager 610 may update the software version being currently operated in the vehicle based on the confirmation and store the updated software version in a lookup table in the memory. For example, the vehicle manager 610 may update the task manager 640 and update the task storage 650 to indicate that the vehicle has performed the OTA update associated with the first task.

Figure 6B:
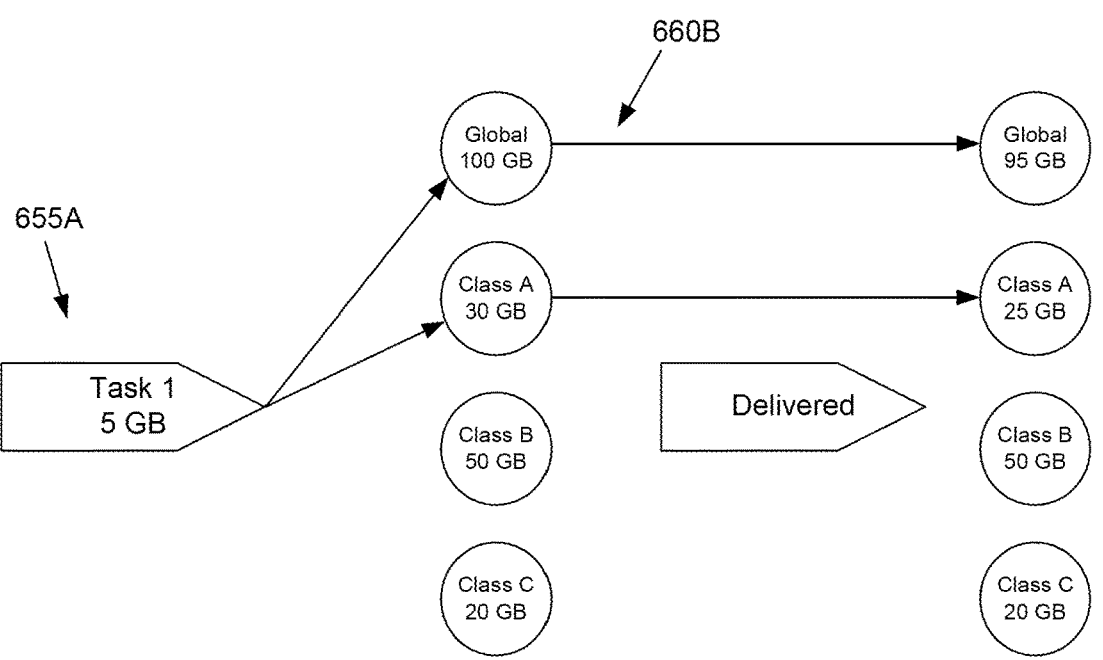
Figure 6C:
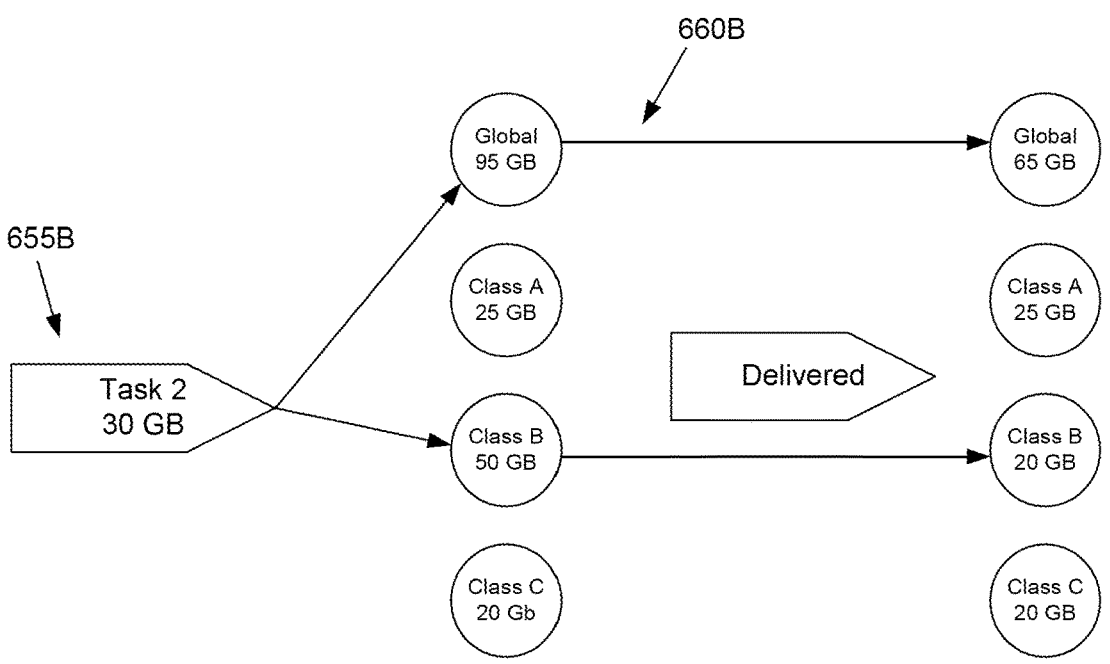
Figure 6D:
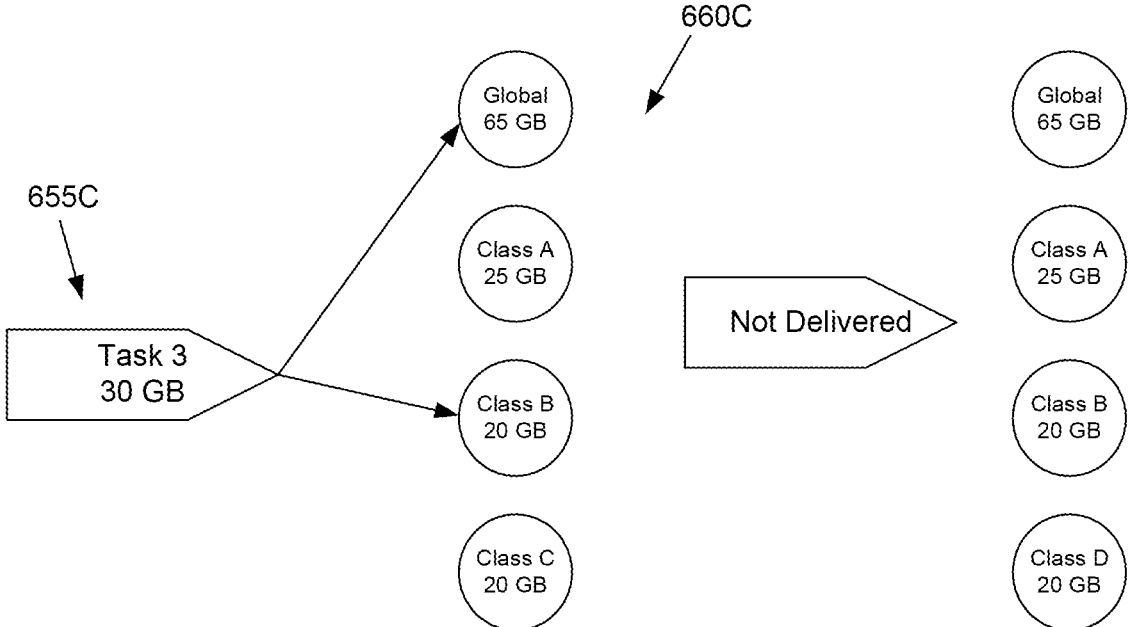

FIGS. 6B-D illustrate examples of tasks and consumption classes associated with the tasks. For example, FIG. 6B depicts a first task 655A that has been selected for vehicle 105. The first task 655A may include a security software update. The first task 655A may have a data size of 5 GB. The vehicle manager 610 may evaluate the first task 655A against a plurality of consumption classes 660A, as described herein. The vehicle manager 610 may determine (e.g., based on the task attributes, class conditions, etc.) that "Class A" may be applicable to the first task 655A. As described herein, Class A may include class specific predicates that help determine whether to transmit the first task 655A (e.g., given the data size associated with the class). The vehicle manager 610 may consider the global/overall bandwidth value of the network. Based on the class consumption limits (and the overall bandwidth value), the vehicle manager 610 may determine that the first task 655A may be delivered. For example, in the event that Class A still has allocated bandwidth and transmission of the first task 655A would not violate its consumption limit (e.g., 30 GB) or that of the overall network (e.g., 100 GB), the vehicle manager 610 may determine that the first task 655A is to be transmitted to the vehicle 105, for the respective time period, for the vehicle to execute the first task 655A (e.g., download the security OTA software update). The vehicle manager 610 may update the consumption limits for the applicable classes. In some instances, the vehicle manager 610 may update a current overall bandwidth value for a network based on the transmission of first task 655A.

In another example, FIG. 6C depicts a second task 655B that has been selected for vehicle 105. The second task 655B may include an operating system update (e.g., to the hardware layer 205). The second task 655B may have a data size of 30 GB. The vehicle manager 610 may evaluate the second task 655B against a plurality of consumption classes 660B. The vehicle manager 610 may determine (e.g., based on the task attributes, class conditions, etc.) that "Class B" may be applicable to the second task 655B. As described herein, Class B may include class specific predicates that help determine whether to transmit the first task 655A (e.g., given the data size associated with the class). Based on the class consumption limits (and the global/overall bandwidth value), the vehicle manager 610 may determine that the second task 655B may be delivered. For example, in the event that Class B still has allocated bandwidth and transmission of the second task 655B would not violate its consumption limit (e.g., 50 GB) or that of the overall network (e.g., 95 GB), the vehicle manager 610 may determine that the second task 655B is to be transmitted to the vehicle 105, for the respective time period, for the vehicle to execute the second task 655B (e.g., download the operating system OTA software update). The vehicle manager 610 may update the consumption limits for the applicable classes. In some instance, the vehicle manager 610 may update a current overall bandwidth value for a network based on the transmission of second task 655B.

In yet another example, FIG. 6D depicts a third task 655C that has been selected for vehicle 105. The third task 655C may include update to an application running on the vehicle 105 (e.g., an entertainment application). The third task 655C may have a data size of 30 GB. The vehicle manager 610 may determine (e.g., based on the task attributes, class conditions, etc.) that "Class B" may be applicable to the third task 655C. As described herein, Class C may include class specific predicates that help determine whether to transmit the third task 655C (e.g., given the data size associated with the class). The vehicle manager 610 may consider the global/overall bandwidth value of the network. Based on the class consumption limits (and the overall bandwidth value), the vehicle manager 610 may determine that the third task 655C may not be delivered. For example, in the event that Class B does not have enough allocated bandwidth or transmission of the third task 655C would violate its consumption limit (e.g., because it is >than 20 GB) or that of the overall network (e.g., 65 GB), the vehicle manager 610 may determine that the third task 655C is not to be transmitted to the vehicle 105, for the respective time period. As described herein, the third task 655C may be stored in a memory for transmission during a later time period.

FIG. 7 illustrates a flowchart diagram of an example method 700 for distributing an over-the-air (OTA) vehicle software update according to an embodiment hereof. The method 700 may be performed by a computing system described with reference to the other figures. In an embodiment, the method 700 may be performed by the control circuit of the remote computing platform 110 and/or the vehicle computing system 200 of FIGS. 1-2D, 4, and/or 9. One or more portions of the method 700 may be implemented as an algorithm on the hardware components of the devices described herein (e.g., as in FIGS. 1-2D, 4, 9). For example, the steps of method 700 may be implemented as operations/instructions that are executable by computing hardware.

FIG. 7 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 7 is described with reference to elements/terms described with respect to other systems and figures, for example illustrated purposes and is not meant to be limiting. One or more portions of method 700 may be performed additionally, or alternatively, by other systems. For example, method 700 may be performed by a control circuit of the computing platform 110.

In an embodiment, the method 700 may begin with or otherwise include an operation 705, in which the computing system can receive a notification from a vehicle. In some instances, the notification can include a vehicle identifier.

The method 700 in an embodiment may include an operation 710, in which the computing system can receive a notification from a vehicle. The notification can include a vehicle identifier (e.g., vehicle identifier number (VIN)). For an illustrative example, vehicle 105, using the vehicle computing system 200, can transmit, to the remote computing platform 110, a request for OTA updates. The request can include the VIN of the vehicle 105.

The method 700 in an embodiment may include an operation 720, in which the computing system can determine a task for the vehicle to download based on the vehicle identifier. In some instances, the task may be associated with the OTA vehicle software update of method 700. The task can include one or more task attributes. Continuing with the illustrative example, the remote computing platform 110 can determine a plurality of tasks (e.g., a first task and a second task) for the vehicle 105 to download based on the VIN of the vehicle. The remote computing platform 110 can perform a look-up function, based on the vehicle identifier, to determine that the vehicle 105 should download the first task (e.g., a first OTA update).

The method 700 in an embodiment may include an operation 730, in which the computing system can determine, from among a plurality of consumption classes, one or more consumption classes that are applicable to the task based on the task attributes. In some instances, each consumption class can be associated with a class consumption limit indicative of a network bandwidth limit specified for the respective consumption class. Alternatively, or additionally, each consumption class can be associated with a class condition for the respective consumption class. The class condition can include a class consumption limit indicative of a network bandwidth limit specified for the respective consumption class. The class condition can also include a priority ranking value for the respective consumption class. Continuing with the illustrative example and similar to the example illustrated in FIG. 6B, the remote computing platform 110 can determine that the first task in the plurality of tasks determined at 720 is associated with Class A. The first task can have a data size of 5 GB, and the consumption class limit of Class A being 30 GB.

In some instances, the one or more task attributes can include at least one of: (i) a type of task, (ii) a data size of the task; (ii) a model of the vehicle; (iv) a vehicle production date; or (iv) a country. Additionally, the task attribute can be derived based on metadata associated with the vehicle, metadata of the vehicle stored in a cloud server, urgency of an update, criticality of an update, vehicle options (e.g., hardware), vehicle activated services, and/or vehicle belonging to group.

The method 700 in an embodiment may include an operation 740, in which the computing system can obtain a current overall bandwidth value for a network. The current overall bandwidth value can indicate a currently remaining network bandwidth for a first time period. Continuing with the illustrative example and similar to the example illustrated in FIG. 6B, the remote computing platform 110 can obtain a current overall bandwidth value of 100 GB for the network.

The method 700 in an embodiment may include an operation 750, in which the computing system can determine, based on the class consumption limit associated with the one or more consumption classes that are applicable to the task and the current overall network bandwidth value, whether to transmit the task to the vehicle over the network during the first time period. Continuing with the illustrative example and similar to the example illustrated in FIG. 6B, the remote computing platform 110 can determine to transmit the first task during the first time period, based on the data size being 5 GB which is less than both the 30 GB consumption class limit of Class A and less than the current overall bandwidth value of 100 GB.

The method 700 in an embodiment may include an operation 760, in which the computing system can obtain a second task for the first time period. Continuing with the illustrative example, the remote computing platform 110 can determine a plurality of tasks, which can include a first task and a second task, for the vehicle 105 to download based on the VIN of the vehicle. As previously mentioned, the remote computing platform 110 can perform a look-up function, based on the vehicle identifier, to determine that the vehicle 105 should download a second task (e.g., a second OTA update).

The method 700 in an embodiment may include an operation 770, in which the computing system can determine, based on class consumption limit associated with one or more consumption classes that are applicable to the second task and the current overall network bandwidth value, whether to transmit the second task to the vehicle over the network during the first time period.

Continuing with the illustrative example and similar to the example illustrated in FIG. 6C, the remote computing platform 110 can determine that the second task in the plurality of tasks determined at 760 is associated with Class B. The second task can have a data size of 30 GB, and the consumption class limit of Class B being 50 GB. In this example, the second task can be transmitted during the first time period because the system determined that the data size (e.g., 30 GB) of the second task does not exceed the consumption class limit for any of the one or more consumption classes (e.g., 50 GB for Class B) that are applicable to the second task.

Alternatively, the second task can be transmitted during a second time period when it is determined that the data size of the second task exceeds the consumption class limit for any of the one or more consumption classes that are applicable to the second task. Continuing with the illustrative example and similar to the example illustrated in FIG. 6D, the remote computing platform 110 can determine that the second task in the plurality of tasks determined at 760 is associated with Class B. The second task can have a data size of 30 GB, and the consumption class limit of Class B being 20 GB. In this example, the second task is not transmitted during the first time period because the system determined that the data size (i.e., 30 GB) of the second task exceeds the consumption class limit (e.g., 20 GB) for Class B.

In some instances, each consumption class can include a priority ranking value. Additionally, the determination at operation 750 of whether to transmit the task to the vehicle over the network during the first time period can be further based on the priority ranking value.

In some instances, method 700 can further include the computing system accessing, from a memory, data indicative of a software version being currently operated in the vehicle based on the vehicle identifier. Additionally, the task for the vehicle to be downloaded may be predetermined based on the software version.

In some instances, method 700 can further include the computing system receiving a confirmation that the vehicle has installed the task. Additionally, the method 700 can include the computing system updating the software version being currently operated in the vehicle based on the confirmation. Moreover, the method 700 can include the computing system storing the updated software version in a lookup table in the memory.

In some instances, the task can be transmitted during the first time period when the current overall bandwidth value for the first time period is below an overall bandwidth threshold for the network during the first time period.

In some instances, the task can be transmitted during a second time period when the current overall bandwidth value for the first time period exceeds an overall bandwidth threshold for the network, and wherein the second time period is after the first time period.

In some instances, the task can be a first task, the method 700 can further include the computing system obtaining a second task for the first time period. Additionally, the computing system can determine, based on class consumption limit associated with one or more consumption classes that are applicable to the second task and the current overall network bandwidth value, whether to transmit the second task to the vehicle over the network during the first time period. The second task can be transmitted during the first time period when it is determined that a data size of the second task does not exceed the consumption class limit for any of the one or more consumption classes that are applicable to the second task. Alternatively, the second task can be transmitted during a second time period when it is determined that a data size of the second task does exceed the consumption class limit for any of the one or more consumption classes that are applicable to the second task.

In some instances, the vehicle identifier includes a location of the vehicle that is associated with a first region, method 700 can further include the computing system obtaining a first region bandwidth value for a first time period. For example, a first region bandwidth value can be associated with a currently remaining network bandwidth in a first region (e.g., Country A, Western region of Country A, Eastern region of Country A) for a first time period. The determination on whether to transmit the task to the vehicle during the first time period can be further based on the first region bandwidth value. For example, the first task can be transmitted during the first time period when it is determined that a data size of the first task does not exceed the first region bandwidth value for the first time period. In this example, the vehicle can be located in Germany, and first task can have a data size that is less than the first region bandwidth value for Germany, therefore the first task can be transmitted to the vehicle during the first time period. Alternatively, the first task can be transmitted during a second time period when it is determined that a data size of the first task does exceed the first region bandwidth value for the first time period.

In some instances, the task determined at 720 can be a first task. Additionally, method 700 can further include the computing system obtaining a first task bandwidth value for the first time period. The first task bandwidth value can be indicative of a currently remaining network bandwidth for the first task. Moreover, method 700 can further include the computing system determining, based on the first task bandwidth value, whether to transmit the first task to the vehicle over the network during the first time period. For example, the computing system can determine that the data size of the first task does not exceed the first task bandwidth value, and be configured to transmit, over the network, the first task for download by the vehicle.

In some instances, method 700 can further include the computing system transmitting the task to the vehicle over the network during the first time period. Additionally, the computing system can update the current overall bandwidth value for the network during the first time period based on a data size associated with the task transmitted to the vehicle.

Figure 8:
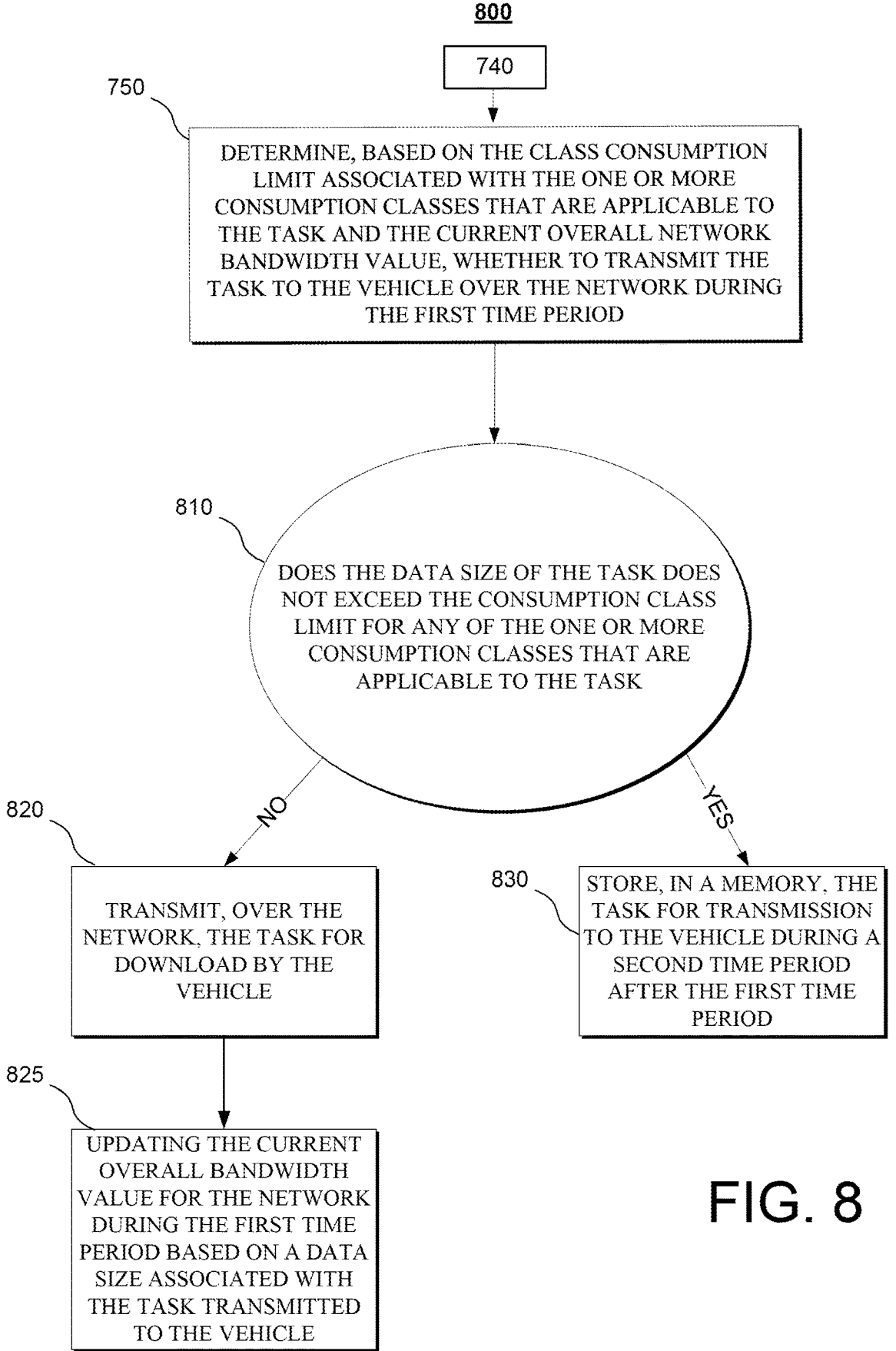
FIG. 8 illustrates a flowchart diagram of an example method for determining whether to transmit the task to the vehicle over the network during the first time period according to an embodiment hereof.

FIG. 8 illustrates a flowchart diagram of an example method 800 for determining whether to transmit the task to the vehicle over the network during the first time period according to an embodiment hereof. The method 800 may be performed by a computing system described with reference to the other figures. In an embodiment, the method 800 may be performed by the control circuit of the computing system. One or more portions of the method 800 may be implemented as an algorithm on the hardware components of the devices described herein. For example, the steps of method 800 may be implemented as operations/instructions that are executable by computing hardware.

FIG. 8 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 8 is described with reference to elements/terms described with respect to other systems and figures, for example illustrated purposes and is not meant to be limiting. One or more portions of method 800 may be performed additionally, or alternatively, by other systems. For example, method 800 may be performed by a control circuit of the computing platform 110.

The method 800 in an embodiment may include an operation 750, in which the computing system can determine, based on the class consumption limit associated with the one or more consumption classes that are applicable to the task and the current overall network bandwidth value, whether to transmit the task to the vehicle over the network during the first time period.

The method 800 in an embodiment may include an operation 810, in which the computing system can determine whether the data size of the task determined at 720 exceeds the consumption class limit for any of the one or more consumption classes that are applicable to the task.

Based on a determination that the data size does not exceed the consumption class limit for any of the one or more consumption classes that are applicable to the task, method 800 may include an operation 820, in which the computing system can transmit, over the network, the task for download by the vehicle.

Additionally, method 800 may include an operation 825, in which the computing system can transmit the task to the vehicle over the network during the first time period, and update the current overall bandwidth value for the network during the first time period based on a data size associated with the task transmitted to the vehicle.

Alternatively, based on a determination that the data size of the task exceeds at least one consumption class limit of the one or more consumption classes that are applicable to the task method 800 may include an operation 830, in which the computing system can store, in a memory, the task for transmission to the vehicle during a second time period after the first time period.

Figure 9:
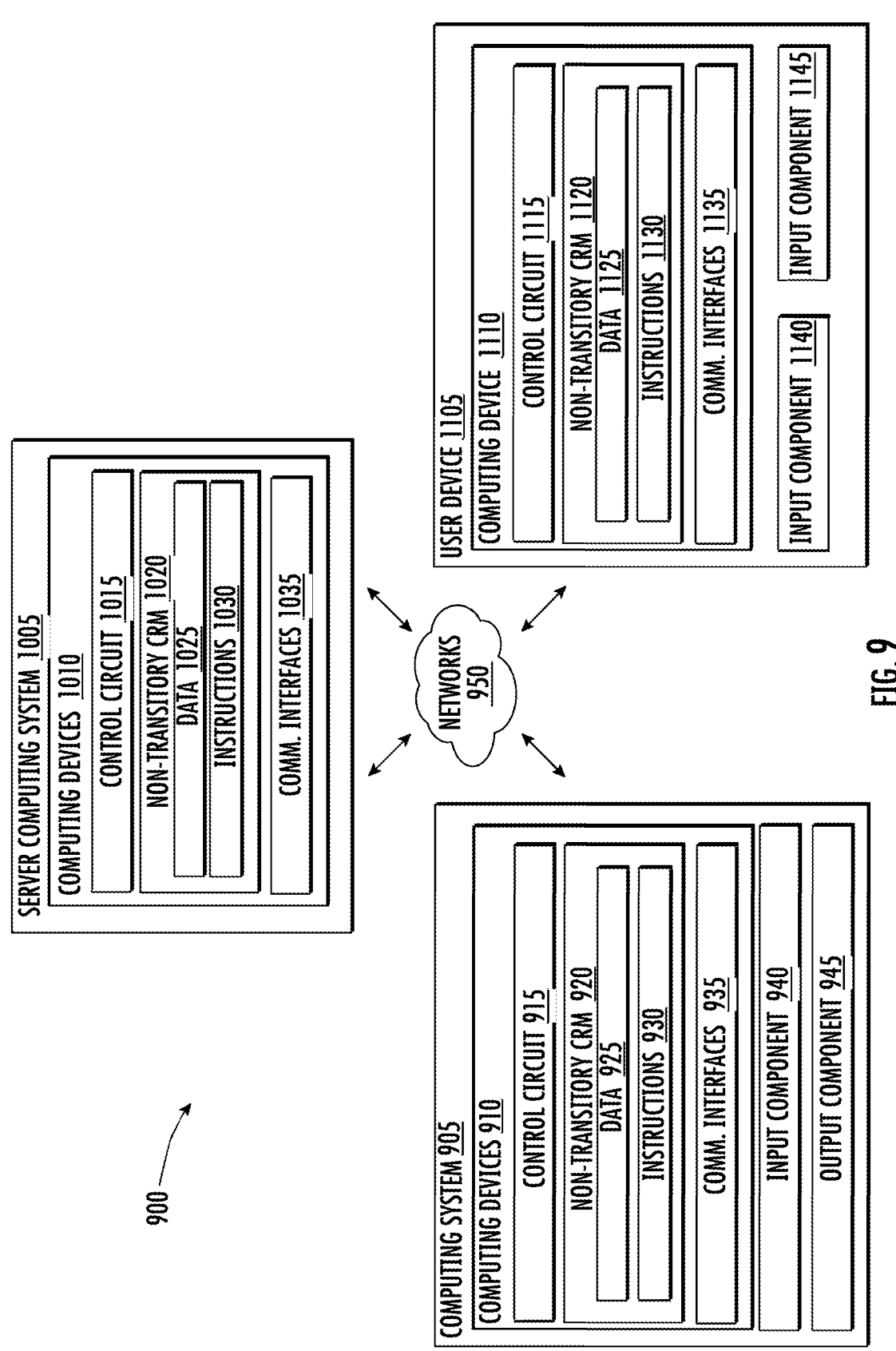
FIG. 9 illustrates a diagram of an example computing ecosystem with computing components according to an embodiment hereof.

FIG. 9 illustrates a block diagram of an example computing system 900 according to an embodiment hereof. The system 900 includes a computing system 905 (e.g., a computing system onboard a vehicle), a server computing system 1005 (e.g., a remote computing system, cloud computing platform), and a user device 805 that are communicatively coupled over one or more networks 950.

The computing system 905 may include one or more computing devices 910 or circuitry. For instance, the computing system 905 may include a control circuit 915 and a non-transitory computer-readable medium 920, also referred to herein as memory. In an embodiment, the control circuit 915 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 915 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 915 may be programmed by one or more computer-readable or computer-executable instructions stored on the non-transitory computer-readable medium 920.

In an embodiment, the non-transitory computer-readable medium 920 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 920 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 920 may store information that may be accessed by the control circuit 915. For instance, the non-transitory computer-readable medium 920 (e.g., memory devices) may store data 925 that may be obtained, received, accessed, written, manipulated, created, and/or stored. The data 925 may include, for instance, any of the data or information described herein. In some implementations, the computing system 905 may obtain data from one or more memories that are remote from the computing system 905.

The non-transitory computer-readable medium 920 may also store computer-readable instructions 930 that may be executed by the control circuit 915. The instructions 930 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 915 to perform one or more functional tasks. The modules and computer-readable/executable instructions may be described as performing various operations or tasks when the control circuit 915 or other hardware component is executing the modules or computer-readable instructions.

The instructions 930 may be executed in logically and/or virtually separate threads on the control circuit 915. For example, the non-transitory computer-readable medium 920 may store instructions 930 that when executed by the control circuit 915 cause the control circuit 915 to perform any of the operations, methods and/or processes described herein. In some cases, the non-transitory computer-readable medium 920 may store computer-executable instructions or computer-readable instructions, such as instructions to perform at least a portion of the method of FIGS. 7-8.

The computing system 905 may include one or more communication interfaces 935. The communication interfaces 935 may be used to communicate with one or more other systems. The communication interfaces 935 may include any circuits, components, software, etc. for communicating via one or more networks (e.g., networks 950). In some implementations, the communication interfaces 935 may include for example, one or more of a communications controller, receiver, transceiver, transmitter, port, conductors, software and/or hardware for communicating data/information.

The computing system 905 may also include one or more user input components 940 that receives user input. For example, the user input component 940 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 905 may include one or more output components 945. The output components 945 may include hardware and/or software for audibly or visually producing content. For instance, the output components 945 may include one or more speakers, earpieces, headsets, handsets, etc. The output components 945 may include a display device, which may include hardware for displaying a user interface and/or messages for a user. By way of example, the output component 945 may include a display screen, CRT, LCD, plasma screen, touch screen, TV, projector, tablet, and/or other suitable display components.

The server computing system 1005 may include one or more computing devices 1010. In an embodiment, the server computing system 1005 may include or is otherwise implemented by one or more server computing devices. In instances in which the server computing system 1005 includes plural server computing devices, such server computing devices may operate according to sequential computing architectures, parallel computing architectures, or some combination thereof.

The server computing system 1005 may include a control circuit 1015 and a non-transitory computer-readable medium 1020, also referred to herein as memory 1020. In an embodiment, the control circuit 1015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1015 may be programmed by one or more computer-readable or computer-executable instructions stored on the non-transitory computer-readable medium 1020.

In an embodiment, the non-transitory computer-readable medium 1020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1020 may store information that may be accessed by the control circuit 1015. For instance, the non-transitory computer-readable medium 1020 (e.g., memory devices) may store data 1025 that may be obtained, received, accessed, written, manipulated, created, and/or stored. The data 1025 may include, for instance, any of the data or information described herein. In some implementations, the server system 1005 may obtain data from one or more memories that are remote from the server system 1005.

The non-transitory computer-readable medium 1020 may also store computer-readable instructions 1030 that may be executed by the control circuit 1015. The instructions 1030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1015 to perform one or more functional tasks. The modules and computer-readable/executable instructions may be described as performing various operations or tasks when the control circuit 1015 or other hardware component is executing the modules or computer-readable instructions.

The instructions 1030 may be executed in logically and/or virtually separate threads on the control circuit 1015. For example, the non-transitory computer-readable medium 1020 may store instructions 1030 that when executed by the control circuit 1015 cause the control circuit 1015 to perform any of the operations, methods and/or processes described herein. In some cases, the non-transitory computer-readable medium 1020 may store computer-executable instructions or computer-readable instructions, such as instructions to perform at least a portion of the method of FIG. 5.

The server computing system 1005 may include one or more communication interfaces 1035. The communication interfaces 1035 may be used to communicate with one or more other systems. The communication interfaces 1035 may include any circuits, components, software, etc. for communicating via one or more networks (e.g., networks 950). In some implementations, the communication interfaces 1035 may include for example, one or more of a communications controller, receiver, transceiver, transmitter, port, conductors, software and/or hardware for communicating data/information.

The computing system 905 and/or the server computing system 1005 may also be in communication with a user device 805 that is communicatively coupled over the networks 950.

The user device 1105 may include one or more computing devices 1110. The user device 1105 may include a control circuit 1115 and a non-transitory computer-readable medium 1120, also referred to herein as memory 1120. In an embodiment, the control circuit 1115 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1115 may be programmed by one or more computer-readable or computer-executable instructions stored on the non-transitory computer-readable medium 1120.

In an embodiment, the non-transitory computer-readable medium 1120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1120 may store information that may be accessed by the control circuit 1115. For instance, the non-transitory computer-readable medium 1120 (e.g., memory devices) may store data 1125 that may be obtained, received, accessed, written, manipulated, created, and/or stored. The data 1125 may include, for instance, any of the data or information described herein. In some implementations, the user device 1105 may obtain data from one or more memories that are remote from the user device 1105.

The non-transitory computer-readable medium 1120 may also store computer-readable instructions 1130 that may be executed by the control circuit 1115. The instructions 1130 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1115 to perform one or more functional tasks. The modules and computer-readable/executable instructions may be described as performing various operations or tasks when the control circuit 1115 or other hardware component is executing the modules or computer-readable instructions.

The instructions 1130 may be executed in logically or virtually separate threads on the control circuit 1115. For example, the non-transitory computer-readable medium 1120 may store instructions 1130 that when executed by the control circuit 1115 cause the control circuit 1115 to perform any of the operations, methods and/or processes described herein. In some cases, the non-transitory computer-readable medium 1120 may store computer-executable instructions or computer-readable instructions, such as instructions to perform at least a portion of the method of FIG. 5.

The user device 1105 may include one or more communication interfaces 1135. The communication interfaces 1135 may be used to communicate with one or more other systems. The communication interfaces 1135 may include any circuits, components, software, etc. for communicating via one or more networks (e.g., networks 950). In some implementations, the communication interfaces 1135 may include for example, one or more of a communications controller, receiver, transceiver, transmitter, port, conductors, software and/or hardware for communicating data/information.

The user device 1105 may also include one or more user input components 1140 that receives user input. For example, the user input component 1140 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 1105 may include one or more output components 1145. The output components 1145 may include hardware and/or software for audibly or visually producing content. For instance, the output components 1145 may include one or more speakers, earpieces, headsets, handsets, etc. The output components 1145 may include a display device, which may include hardware for displaying a user interface and/or messages for a user. By way of example, the output component 1145 may include a display screen, CRT, LCD, plasma screen, touch screen, TV, projector, tablet, and/or other suitable display components.

The one or more networks 950 may be any type of communications network, such as a local area network (e.g., intranet), wide area network (e.g., Internet), or some combination thereof and may include any number of wired or wireless links. In general, communication over a network 1050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computer-implemented method for distributing an over-the-air (OTA) vehicle software update. The method may include receiving a notification from a vehicle. The notification can include a vehicle identifier. Additionally, the method may include determining a task for the vehicle to download based on the vehicle identifier. The task can be associated with the OTA vehicle software update. The task can include one or more task attributes. Moreover, the method may include determining, from among a plurality of consumption classes, one or more consumption classes that are applicable to the task based on the task attributes. Each consumption class can be associated with a class consumption limit indicative of a network bandwidth limit specified for the respective consumption class. Furthermore, the method may include obtaining a current overall bandwidth value for a network. The current overall bandwidth value can indicate a currently remaining network bandwidth for a first time period. Subsequently, the method may include determining, based on the class consumption limit associated with the one or more consumption classes that are applicable to the task and the current overall network bandwidth value, whether to transmit the task to the vehicle over the network during the first time period.

Embodiment 2 includes the method of Embodiment 1. In this embodiment, the determining whether to transmit the task to the vehicle over the network during the first time period can include determining that the data size of the task does not exceed the consumption class limit for any of the one or more consumption classes that are applicable to the task. Additionally, the method may include transmitting, over the network, the task for download by the vehicle.

Embodiment 3 includes the method of Embodiment 1. In this embodiment, the determining whether to transmit the task to the vehicle over the network during the first time period can include determining that the data size of the task exceeds at least one consumption class limit of the one or more consumption classes that are applicable to the task. Additionally, the method may include storing, in a memory, the task for transmission to the vehicle during a second time period after the first time period.

Embodiment 4 includes the method of any of embodiments 1 to 3. In this embodiment, the one or more task attributes may include at least one of: (i) a type of task, (ii) a data size of the task; (ii) a model of the vehicle; (iv) a vehicle production date; or (iv) a country.

Embodiment 5 includes the method of any of embodiments 1 to 4. In this embodiment, each consumption class can have a priority ranking value, and the determination whether to transmit the task to the vehicle over the network during the first time period can be further based on the priority ranking value.

Embodiment 6 includes the method of any of embodiments 1 to 5. In this embodiment, the method may include accessing, from a memory, data indicative of a software version being currently operated in the vehicle based on the vehicle identifier. The task for the vehicle to be downloaded can be predetermined based on the software version.

Embodiment 7 includes the method of Embodiment 6. In this embodiment, the method may include receiving a confirmation that the vehicle has installed the task. Additionally, the method may include updating the software version being currently operated in the vehicle based on the confirmation. Furthermore, the method may include storing the updated software version in a lookup table in the memory.

Embodiment 8 includes the method of any of Embodiments 1, 2, or 4-7. In this embodiment, the task can be transmitted during the first time period when the current overall bandwidth value for the first time period is below an overall bandwidth threshold for the network during the first time period.

Embodiment 9 includes the method of any of Embodiments 1 to 7. In this embodiment, the task may be transmitted during a second time period when the current overall bandwidth value for the first time period exceeds an overall bandwidth threshold for the network, and wherein the second time period is after the first time period.

Embodiment 10 includes the method of any of Embodiments 1 to 9. In this embodiment, the task can be a first task, and the method may include obtaining a second task for the first time period. Additionally, the method may include determining, based on class consumption limit associated with one or more consumption classes that are applicable to the second task and the current overall network bandwidth value, whether to transmit the second task to the vehicle over the network during the first time period. Moreover, the second task can be transmitted during the first time period when it is determined that a data size of the second task does not exceed the consumption class limit for any of the one or more consumption classes that are applicable to the second task.

Embodiment 11 includes the method of any of Embodiments 1 to 10. In this embodiment, the vehicle identifier can include a location of the vehicle that is associated with a first region, and the method may include obtaining a first region bandwidth value for a first time period. Additionally, the determination on whether to transmit the task to the vehicle during the first time period can be further based on the first region bandwidth value.

Embodiment 12 includes the method of any of Embodiments 1 to 11. In this embodiment, the method may include transmitting the task to the vehicle over the network during the first time period. Additionally. The method may include updating the current overall bandwidth value for the network during the first time period based on a data size associated with the task transmitted to the vehicle.

Embodiment 13 relates to a computing system. The computing system may include a control circuit. The control circuit may be configured to receive a notification from a vehicle. The notification can include a vehicle identifier. The control circuit may be configured to determine one or more tasks for the vehicle to download based on the vehicle identifier. The one or more tasks can be associated with an over-the-air (OTA) vehicle software update. The control circuit may be configured to determine, from among a plurality of consumption classes, one or more consumption classes that are applicable to the one or more tasks, wherein each consumption class is associated with a class condition for the respective consumption class, the class condition comprising a class consumption limit indicative of a network bandwidth limit specified for the respective consumption class. The control circuit may be configured to obtain a current overall bandwidth value for a network, the current overall bandwidth value indicating a currently remaining network bandwidth for a first time period. The control circuit may be configured to determining, based on the class conditions associated with the one or more consumption classes that are applicable to the task and the current overall network bandwidth value, whether to transmit the one or more tasks to the vehicle over the network during the first time period.

Embodiment 14 includes the method of Embodiment 13. In this embodiment, the determining whether transmit the one or more tasks to the vehicle over the network during the first time period may include determining that the data size of a first task, of the one or more tasks, does not exceed the consumption class limit for any of the one or more consumption classes that are applicable to the first task. Additionally, the control circuit may be further configured to transmit, over the network, the first task for download by the vehicle.

Embodiment 15 includes the method of Embodiment 14. In this embodiment, the determining whether to transmit the one or more tasks to the vehicle over the network during the first time period may include determining that the data size of a second task, of the one or more tasks, exceeds at least one consumption class limit of the one or more consumption classes that are applicable to the second task. Additionally, the control circuit may be further configured to store, in a memory, the second task for transmission to the vehicle during a second time period after the first time period.

Embodiment 16 includes the method of any of embodiments 13 to 15. In this embodiment, the one or more tasks includes a first task having a first type of software update and a second task having a second type of software update, and wherein the first type of software update has as higher priority than the second type of software update.

Embodiment 17 includes the method of Embodiment 16. In this embodiment, the first type of software update can be a software security update, and the second type of software update can be an operating system update.

Embodiment 18 includes the method of any of embodiments 13 to 17. In this embodiment, the one or more tasks can include a first task, and the control circuit may be further configured to obtain a first task bandwidth value for the first time period, the first task bandwidth value indicating a currently remaining network bandwidth for the first task. Additionally, the control circuit may be further configured to determine, based on the first task bandwidth value, whether to transmit the first task to the vehicle over the network during the first time period.

Embodiment 19 includes the method of Embodiment 18. In this embodiment, the control circuit may be further configured to determine that a data size of the first task does not exceed the first task bandwidth value. Additionally, the control circuit may be further configured to transmit, over the network, the first task for download by the vehicle.

Embodiment 20 relates to one or more non-transitory computer-readable media that store instructions that are executable by a control circuit to perform operations. The control circuit may receive a notification from a vehicle, the notification having a vehicle identifier. Additionally, the control circuit may determine one or more tasks for the vehicle to download based on the vehicle identifier, the one or more tasks being associated with the OTA vehicle software update. Moreover, the control circuit may determine, from among a plurality of consumption classes, one or more consumption classes that are applicable to the one or more tasks, wherein each consumption class is associated with one or more class conditions for the respective consumption class, the class conditions comprising a class consumption limit indicative of a network bandwidth limit specified for the respective consumption class. Furthermore, the control circuit may obtain a current overall bandwidth value for a network, the current overall bandwidth value indicating a currently remaining network bandwidth for a first time period. Subsequently, the control circuit may determine, based on the class conditions associated with the one or more consumption classes that are applicable to the task and the current overall network bandwidth value, whether to transmit the one or more tasks to the vehicle over the network during the first time period.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . (i), (ii), (iii), . . . , etc. may be used to illustrate operations or different elements in a list. Such identifiers are provided for the case of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computer-implemented method for distributing an over-the-air (OTA) vehicle software update, the method comprising:

receiving a notification from a vehicle, the notification having a vehicle identifier;

determining a task for the vehicle to download based on the vehicle identifier, the task being associated with the OTA vehicle software update, the task comprising one or more task attributes, wherein the one or more task attributes includes a vehicle production date;

determining, from among a plurality of consumption classes, one or more consumption classes that are applicable to the task based on the task attributes, wherein each consumption class is associated with a class consumption limit indicative of a network bandwidth limit specified for the respective consumption class;

processing sensor data and map data to obtain a determined position of the vehicle, wherein the sensor data includes LIDAR data and camera data;

processing the LIDAR data and the camera data to match the sensor data to a map of a surrounding environment to obtain the determined position of the vehicle;

obtaining a current overall bandwidth value for a network, the current overall bandwidth value indicating a currently remaining network bandwidth for a first time period; and transmitting, over the network during the first time period, the task for download by the vehicle based on the determined position of the vehicle and when:

the current overall bandwidth value for the first time period is below an overall bandwidth threshold for the network during the first time period; and a data size of the task does not exceed the class consumption limit for any of the one or more consumption classes that are applicable to the task.

2. The computer-implemented method of claim 1, wherein the one or more task attributes comprise at least one of: (i) a type of task, (ii) a data size of the task; (iii) a model of the vehicle; or (iv) a country.

3. The computer-implemented method of claim 1, wherein each consumption class has a priority ranking value, and wherein the transmission of the task to the vehicle over the network during the first time period is further based on the priority ranking value.

4. The computer-implemented method of claim 1, further comprising:

accessing, from a memory, data indicative of a software version being currently operated in the vehicle based on the vehicle identifier, and wherein the task for the vehicle to be downloaded is predetermined based on the software version.

5. The computer-implemented method of claim 4, further comprising:

receiving a confirmation that the vehicle has installed the task;

updating the software version being currently operated in the vehicle based on the confirmation; and storing the updated software version in a lookup table in the memory.

6. The computer-implemented method of claim 1, wherein the task is a first task, the method further comprising:

obtaining a second task for the first time period; and determining, based on class consumption limit associated with one or more consumption classes that are applicable to the second task and the current overall network bandwidth value, whether to transmit the second task to the vehicle over the network during the first time period, wherein the second task is transmitted during the first time period when it is determined that a data size of the second task does not exceed the consumption class limit for any of the one or more consumption classes that are applicable to the second task.

7. The computer-implemented method of claim 1, wherein the vehicle identifier includes a location of the vehicle that is associated with a first region, the method further comprising:

obtaining a first region bandwidth value for a first time period; and wherein the transmission of the task to the vehicle during the first time period is further based on the first region bandwidth value.

8. The computer-implemented method of claim 1, further comprising:

updating the current overall bandwidth value for the network during the first time period based on a data size associated with the task transmitted to the vehicle.

9. The computer-implemented method of claim 1, further comprising:

transmitting, over the network during the first time period, the task further based on the vehicle identifier.

10. The computer-implemented method of claim 9, wherein the vehicle identifier is a vehicle identifier number (VIN) of the vehicle.

11. The computer-implemented method of claim 1, wherein the task is transmitted using an application programming interface that establishes a secure communication channel, and wherein the secure communication channel is established using a programmatic access operation, a Simple Object Access Protocol (SOAP) operation, a remote procedure call (RPC) operation, or a scripting access operation.

12. The computer-implemented method of claim 1, further comprising:

determining that the data size of a second task exceeds at least one consumption class limit of the one or more consumption classes that are applicable to the second task, and wherein the control circuit is further configured to store, in a memory, the second task for transmission to the vehicle during a second time period after the first time period.

13. A computing system comprising: a control circuit configured to:

receiving a notification from a vehicle, the notification having a vehicle identifier;

determining one or more tasks for the vehicle to download based on the vehicle identifier, the one or more tasks being associated with an over-the-air (OTA) vehicle software update, wherein the one or more tasks includes a first task;

determining, from among a plurality of consumption classes, one or more consumption classes that are applicable to the one or more tasks, wherein each consumption class is associated with a class condition for the respective consumption class, the class condition comprising a class consumption limit indicative of a network bandwidth limit specified for the respective consumption class;

processing sensor data and map data to obtain a determined position of the vehicle, wherein the sensor data includes LIDAR data and camera data;

processing the LIDAR data and the camera data to match the sensor data to a map of a surrounding environment to obtain the determined position of the vehicle;

obtaining a current overall bandwidth value for a network, the current overall bandwidth value indicating a currently remaining network bandwidth for a first time period; and transmitting, over the network during the first time period, the first task for download by the vehicle based on the determined position of the vehicle and when:

the current overall bandwidth value for the first time period is below an overall bandwidth threshold for the network during the first time period; and a data size of the first task does not exceed the class consumption limit for any of the one or more consumption classes that are applicable to the task.

14. The computing system of claim 13, wherein the control circuit is further configured to store, in a memory, a second task, of the one or more tasks, for transmission to the vehicle during a second time period after the first time period when the data size of the second task exceeds at least one consumption class limit of the one or more consumption classes that are applicable to the second task.

15. The computing system of claim 13, wherein the one or more tasks includes first task having a first type of software update and a second task having a second type of software update, and wherein the first type of software update has as higher priority than the second type of software update.

16. The computing system of claim 15, wherein the first type of software update is a software security update, and wherein the second type of software update is an operating system update.

17. The computing system of claim 13, the control circuit further configured to:

obtaining a first task bandwidth value for the first time period, the first task bandwidth value indicating a currently remaining network bandwidth for the first task; and determining, based on the first task bandwidth value, whether to transmit the first task to the vehicle over the network during the first time period.

18. The computer system of claim 17, the control circuit further configured to:

determining that a data size of the first task does not exceed the first task bandwidth value, and wherein the control circuit is further configured to transmit, over the network, the first task for download by the vehicle.

19. One or more non-transitory computer-readable media that store instructions that are executable by a control circuit to:

receive a notification from a vehicle, the notification having a vehicle identifier;

determine one or more tasks for the vehicle to download based on the vehicle identifier, the one or more tasks being associated with an OTA vehicle software update;

determine, from among a plurality of consumption classes, one or more consumption classes that are applicable to the one or more tasks, wherein each consumption class is associated with one or more class conditions for the respective consumption class, the class conditions comprising a class consumption limit indicative of a network bandwidth limit specified for the respective consumption class;

process sensor data and map data to obtain a determined position of the vehicle, wherein the sensor data includes LIDAR data and camera data;

processing the LIDAR data and the camera data to match the sensor data to a map of a surrounding environment to obtain the determined position of the vehicle;

obtain a current overall bandwidth value for a network, the current overall bandwidth value indicating a currently remaining network bandwidth for a first time period; and transmit, over the network during the first time period, the task for download by the vehicle based on the determined position of the vehicle and when:

the current overall bandwidth value for the first time period is below an overall bandwidth threshold for the network during the first time period; and a data size of the task does not exceed the class consumption limit for any of the one or more consumption classes that are applicable to the task.

* * * * *